US010547925B2

(12) United States Patent
Kuki et al.

(10) Patent No.: US 10,547,925 B2
(45) Date of Patent: Jan. 28, 2020

(54) SOUND-PERMEABLE MEMBRANE, SOUND-PERMEABLE MEMBRANE MEMBER INCLUDING SAME, MICROPHONE, AND ELECTRONIC DEVICE

(71) Applicant: NITTO DENKO CORPORATION, Osaka (JP)

(72) Inventors: Nobuharu Kuki, Osaka (JP); Masaaki Mori, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/519,302

(22) PCT Filed: Oct. 15, 2015

(86) PCT No.: PCT/JP2015/005220
§ 371 (c)(1),
(2) Date: Apr. 14, 2017

(87) PCT Pub. No.: WO2016/059804
PCT Pub. Date: Apr. 21, 2016

(65) Prior Publication Data
US 2017/0245036 A1    Aug. 24, 2017

(30) Foreign Application Priority Data
Oct. 16, 2014    (JP) .................................. 2014-211543

(51) Int. Cl.
*H04R 1/02* (2006.01)
*H04R 1/08* (2006.01)
*C08J 7/12* (2006.01)

(52) U.S. Cl.
CPC ................ *H04R 1/086* (2013.01); *C08J 7/12* (2013.01); *C08J 2327/18* (2013.01)

(58) Field of Classification Search
CPC combination set(s) only.
See application file for complete search history.

(56) References Cited

U.S. PATENT DOCUMENTS 8,695,812 B2 *   4/2014   Hone .................... B29C 55/005
                                                   210/500.36
2005/0094832 A1 *  5/2005   Song ........................ H04R 1/06
                                                   381/174

(Continued)

FOREIGN PATENT DOCUMENTS

CN          103649187 A       3/2014
JP          2007-81881         3/2007

(Continued)

OTHER PUBLICATIONS

International Search Report, along with English-language translation thereof, issued in PCT/JP2015/005220 dated Dec. 15, 2015.

(Continued)

*Primary Examiner* — Amir H Etesam
(74) *Attorney, Agent, or Firm* — Greenblum & Bernstein, P.L.C.

(57) ABSTRACT

The sound-permeable membrane of the present invention is adapted, when placed over an opening for directing sound to or from a sound transducer, to prevent entry of foreign matters into the sound transducer through the opening while permitting passage of sound, the sound-permeable membrane including a non-porous film or a multilayer membrane including the non-porous film. The non-porous film is formed of oriented polytetrafluoroethylene. This sound-permeable membrane has an unconventional configuration and exhibits various excellent properties. At least one principal surface of the non-porous film may have a region subjected to a surface modification treatment.

22 Claims, 15 Drawing Sheets

(56) References Cited

U.S. PATENT DOCUMENTS

| | | | |
|---|---|---|---|
| 2009/0268928 A1 | 10/2009 | Ikeyama et al. | |
| 2011/0143114 A1 | 6/2011 | Horie et al. | |
| 2011/0255728 A1* | 10/2011 | Abe | H04M 1/03 381/355 |
| 2013/0058509 A1* | 3/2013 | Mietta | H04R 1/086 381/174 |
| 2015/0071472 A1* | 3/2015 | Lee | H04R 1/023 381/334 |

FOREIGN PATENT DOCUMENTS

| | | |
|---|---|---|
| JP | 2008-199225 | 8/2008 |
| JP | 2010-193439 | 9/2010 |
| JP | 2011-78089 | 4/2011 |
| WO | 2013/012905 A2 | 1/2013 |

OTHER PUBLICATIONS

"Examples of Molding of Plastic Products—Mold Press, Lamination, and Extrusion", Yulong Zhang, Beijing Mechanical Industry Press, 2005.

\* cited by examiner

SOUND-PERMEABLE MEMBRANE, SOUND-PERMEABLE MEMBRANE MEMBER INCLUDING SAME, MICROPHONE, AND ELECTRONIC DEVICE

TECHNICAL FIELD

The present invention relates to a sound-permeable membrane that prevents entry of foreign matters into a sound transducer included in an audio part such as a microphone or speaker while permitting passage of sound to or from the sound transducer, and also relates to a sound-permeable membrane member including the sound-permeable membrane. The present invention further relates to a microphone including the sound-permeable membrane or sound-permeable membrane member and to an electronic device including the microphone.

BACKGROUND ART

Electronic devices having an audio function, such as mobile phones including smartphones, digital cameras, and wearable terminals, have become increasingly widespread. The housing of such an electronic device having an audio function encloses an audio part including a sound emitter such as a speaker and/or a sound receiver such as a microphone. The housing of the electronic device is typically provided with an opening positioned in register with such an audio part, and sound is transmitted through this opening between the outside of the electronic device and the audio part. For example, a microphone included in such an electronic device is typically a small-sized condenser microphone, which is enclosed in the housing of the electronic device in the form of a microphone unit including a package (housing) and a sound transducer enclosed in the package. Sound coming from the outside is directed to the sound transducer of the microphone through an opening formed as a sound inlet port in the housing and through an opening formed as a sound inlet port in the package. If a foreign matter such as dust comes in through the sound inlet ports, the foreign matter shakes in the vicinity of the sound transducer to cause noise. Entry of a foreign matter into the sound transducer also leads to failure of the microphone. Thus, in general, a sound-permeable membrane that prevents entry of foreign matters while permitting passage of sound is placed over the opening of at least one member selected from the housing and the package. The placement of the sound-permeable membrane also reduces noise induced by wind or breath. Possible examples of the foreign matters include water in addition to dust.

A porous sheet having air permeability is used as the sound-permeable membrane. JP 2008-199225 A states that a woven fabric or non-woven fabric of fibers formed of a resin such as nylon or polyethylene can be used as a sound-permeable membrane. JP 2007-81881 A states that a porous membrane of polytetrafluoroethylene (PTFE) can be used as a sound-permeable membrane. Given the properties of the porous PTFE membrane, this membrane is expected to prevent entry of foreign matters, including not only dust but also water. JP 2011-78089 A states that a non-porous film formed of a resin such as PTFE, polyester, polycarbonate, polyethylene, or polyimide can be used as a sound-permeable membrane, although JP 2011-78089 A does not disclose a porous sheet.

CITATION LIST

Patent Literature

Patent Literature 1: JP 2008-199225 A
Patent Literature 2: JP 2007-81881 A
Patent Literature 3: JP 2011-78089 A

SUMMARY OF INVENTION

Technical Problem

An object of the present invention is to provide a sound-permeable membrane having an unconventional configuration and having various excellent properties.

Solution to Problem

A sound-permeable membrane of the present invention is a sound-permeable membrane adapted, when placed over an opening for directing sound to or from a sound transducer, to prevent entry of foreign matters into the sound transducer through the opening while permitting passage of sound, the sound-permeable membrane including a non-porous film or a multilayer membrane including the non-porous film, the non-porous film being formed of oriented polytetrafluoroethylene.

A sound-permeable membrane member of the present invention includes: a sound-permeable membrane adapted, when placed over an opening for directing sound to or from a sound transducer, to prevent entry of foreign matters into the sound transducer through the opening while permitting passage of sound; and a bonding portion placed on a peripheral portion of at least one principal surface of the sound-permeable membrane to join the sound-permeable membrane to another member, the sound-permeable membrane being the above sound-permeable membrane of the present invention.

A microphone of the present invention includes: a sound transducer; a package enclosing the sound transducer and provided with a sound inlet port for directing sound to the sound transducer; and a sound-permeable membrane joined to the package to cover the sound inlet port and adapted to prevent entry of foreign matters into the sound transducer through the sound inlet port while permitting passage of sound, the sound-permeable membrane being the above sound-permeable membrane of the present invention.

In another aspect, the microphone of the present invention includes: a sound transducer; a package enclosing the sound transducer and provided with a sound inlet port for directing sound to the sound transducer; and a sound-permeable membrane member including a sound-permeable membrane joined to the package to cover the sound inlet port and adapted to prevent entry of foreign matters into the sound transducer through the sound inlet port while permitting passage of sound, the sound-permeable membrane member being the above sound-permeable membrane member of the present invention.

An electronic device of the present invention includes: a housing; and a microphone placed in the housing and including a sound transducer and a package enclosing the sound transducer, the package being provided with a sound inlet port for directing sound to the sound transducer, the housing being provided with a sound inlet port for directing sound to the microphone, the electronic device further including a sound-permeable membrane joined to at least one member selected from the package and the housing so as to cover the sound inlet port of the at least one member, the sound-permeable membrane being adapted to prevent entry of foreign matters into the sound transducer through the sound inlet port while permitting passage of sound, the sound-permeable membrane being the above sound-permeable membrane of the present invention.

In another aspect, the electronic device of the present invention includes: a housing; and a microphone placed in the housing and including a sound transducer and a package enclosing the sound transducer, the package being provided with a sound inlet port for directing sound to the sound transducer, the housing being provided with a sound inlet port for directing sound to the microphone, the electronic device further including a sound-permeable membrane member including a sound-permeable membrane joined to at least one member selected from the package and the housing so as to cover the sound inlet port of the at least one member, the sound-permeable membrane being adapted to prevent entry of foreign matters into the sound transducer through the sound inlet port while permitting passage of sound, the sound-permeable membrane member being the above sound-permeable membrane member of the present invention.

Advantageous Effects of Invention

The present invention makes it possible to obtain a sound-permeable membrane having an unconventional configuration and having various excellent properties.

DESCRIPTION OF EMBODIMENTS

Figure 1A:
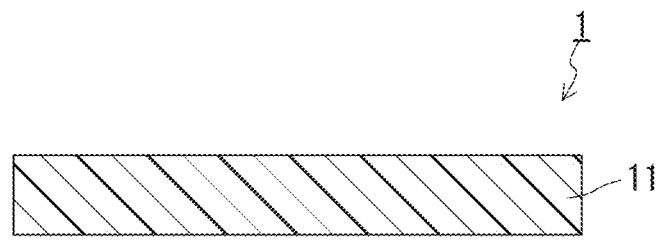
FIG. 1A is a cross-sectional view schematically showing an example of the sound-permeable membrane of the present invention.

The first aspect of the present disclosure provides a sound-permeable membrane adapted, when placed over an opening for directing sound to or from a sound transducer, to prevent entry of foreign matters into the sound transducer through the opening while permitting passage of sound, the sound-permeable membrane including a non-porous film or a multilayer membrane including the non-porous film, the non-porous film being formed of oriented polytetrafluoroethylene.

The second aspect of the present disclosure provides the sound-permeable membrane as set forth in the first aspect, having a surface density of 30 $g/m^2$ or less.

The third aspect of the present disclosure provides the sound-permeable membrane as set forth in the first or second aspect, wherein an average insertion loss in the frequency range of 100 to 5000 Hz is less than 5 dB.

The fourth aspect of the present disclosure provides the sound-permeable membrane as set forth in any one of the first to third aspects, wherein the non-porous film is uncovered.

The fifth aspect of the present disclosure provides the sound-permeable membrane as set forth in any one of the first to fourth aspects, wherein at least one principal surface of the non-porous film has a region subjected to a surface modification treatment.

The sixth aspect of the present disclosure provides the sound-permeable membrane as set forth in the fifth aspect, wherein the region is formed in a peripheral portion of the at least one principal surface.

The seventh aspect of the present disclosure provides the sound-permeable membrane as set forth in the fifth or sixth aspect, wherein the surface modification treatment is a chemical treatment or a sputter etching treatment.

The eighth aspect of the present disclosure provides the sound-permeable membrane as set forth in any one of the first to seventh aspects, for use in a microphone.

The ninth aspect of the present disclosure provides a sound-permeable membrane member including: a sound-permeable membrane adapted, when placed over an opening for directing sound to or from a sound transducer, to prevent entry of foreign matters into the sound transducer through the opening while permitting passage of sound; and a bonding portion placed on a peripheral portion of at least one principal surface of the sound-permeable membrane to join the sound-permeable membrane to another member, wherein the sound-permeable membrane is the sound-permeable membrane as set forth in any one of the first to eighth aspects.

The tenth aspect of the present disclosure provides the sound-permeable membrane member as set forth in the ninth aspect, wherein at least one principal surface of the non-porous film included in the sound-permeable membrane has a region subjected to a surface modification treatment.

The eleventh aspect of the present disclosure provides the sound-permeable membrane member as set forth in the tenth aspect, wherein the non-porous film of the sound-permeable membrane is uncovered, and the bonding portion is placed on the region formed in an uncovered surface of the non-porous film.

The twelfth aspect of the present disclosure provides the sound-permeable membrane member as set forth in any one of the ninth to eleventh aspects, wherein the bonding portion is formed of a double-coated adhesive tape or an adhesive.

The thirteenth aspect of the present disclosure provides the sound-permeable membrane member as set forth in the twelfth aspect, wherein the double-coated adhesive tape is a thermosetting adhesive tape.

The fourteenth aspect of the present disclosure provides the sound-permeable membrane member as set forth in the twelfth aspect, wherein the adhesive is an epoxy adhesive.

The fifteenth aspect of the present disclosure provides the sound-permeable membrane member as set forth in any one of the ninth to fourteenth aspects, further including a printed board provided with a sound transmission hole, wherein the sound-permeable membrane and the printed board are united together via the bonding portion in such a manner as to allow sound to pass through the sound transmission hole and the sound-permeable membrane.

The sixteenth aspect of the present disclosure provides the sound-permeable membrane member as set forth in any one of the ninth to fifteenth aspects, for use in a microphone.

The seventeenth aspect of the present disclosure provides a microphone including: a sound transducer; a package enclosing the sound transducer and provided with a sound inlet port for directing sound to the sound transducer; and a sound-permeable membrane joined to the package to cover the sound inlet port and adapted to prevent entry of foreign matters into the sound transducer through the sound inlet port while permitting passage of sound, wherein the sound-permeable membrane is the sound-permeable membrane as set forth in any one of the first to eighth aspects.

The eighteenth aspect of the present disclosure provides a microphone including: a sound transducer; a package enclosing the sound transducer and provided with a sound inlet port for directing sound to the sound transducer; and a sound-permeable membrane member including a sound-permeable membrane joined to the package to cover the sound inlet port and adapted to prevent entry of foreign matters into the sound transducer through the sound inlet port while permitting passage of sound, wherein the sound-permeable membrane member is the sound-permeable membrane member as set forth in any one of the ninth to sixteenth aspects.

The nineteenth aspect of the present disclosure provides an electronic device including: a housing; and a microphone placed in the housing and including a sound transducer and a package enclosing the sound transducer, the package being provided with a sound inlet port for directing sound to the sound transducer, the housing being provided with a sound inlet port for directing sound to the microphone, the electronic device further including a sound-permeable membrane joined to at least one member selected from the package and the housing so as to cover the sound inlet port of the at least one member, the sound-permeable membrane being adapted to prevent entry of foreign matters into the sound transducer through the sound inlet port while permitting passage of sound, wherein the sound-permeable membrane is the sound-permeable membrane as set forth in any one of the first to eighth aspects.

The twelfth aspect of the present disclosure provides an electronic device including: a housing; and a microphone placed in the housing and including a sound transducer and a package enclosing the sound transducer, the package being provided with a sound inlet port for directing sound to the sound transducer, the housing being provided with a sound inlet port for directing sound to the microphone, the electronic device further including a sound-permeable membrane member including a sound-permeable membrane joined to at least one member selected from the package and the housing so as to cover the sound inlet port of the at least one member, the sound-permeable membrane being adapted to prevent entry of foreign matters into the sound transducer through the sound inlet port while permitting passage of sound, wherein the sound-permeable membrane member is the sound-permeable membrane member as set forth in any one of the ninth to sixteenth aspects.

Hereinafter, the present invention will be described with reference to the drawings. The present invention is not limited to the embodiments described below.

[Sound-Permeable Membrane]

FIG. 1A shows an example of the sound-permeable membrane of the present invention. The sound-permeable membrane 1 shown in FIG. 1A is adapted, when placed over an opening (sound inlet port) for directing sound to a sound transducer included in a sound receiver such as a microphone or over an opening for directing sound from a sound transducer included in a sound emitter such as a speaker, to prevent entry of foreign matters such as water and dust into the sound transducer through the opening while permitting passage of sound. Examples of the opening include openings formed in a housing of an electronic device including the sound receiver and/or sound emitter and openings formed in packages (housings) that are components of the sound receiver and sound emitter. The placement of the sound-permeable membrane 1 can make it possible to prevent entry of foreign matters such as water and dust into the housing of the electronic device through the opening while permitting passage of sound, depending on the configuration of an opening over which the sound-permeable membrane 1 is placed and on how the sound-permeable membrane 1 is placed. The sound-permeable membrane 1 includes a non-porous film 11. The non-porous film 11 is formed of oriented polytetrafluoroethylene (PTFE).

Due to the configuration as described above, the sound-permeable membrane 1 exhibits various excellent properties. One of the excellent properties is high resistance to the entry of foreign matters.

Specifically, the sound-permeable membrane 1 of the present invention includes the non-porous film 11 or a multilayer membrane including the non-porous film 11 and, due to including a non-porous film, has a high ability to prevent entry of foreign matters such as dust into a sound transducer. For example, the sound-permeable membrane 1 is capable of preventing entry into a sound transducer of foreign matters such as fine dust which are difficult to block by a conventional sound-permeable membrane based on a porous sheet. For example, a microphone including such a sound-permeable membrane 1 has a low risk of generating noise or experiencing failure due to entry of foreign matters into the sound transducer of the microphone and is highly reliable.

The sound-permeable membrane 1 exhibits not only high dust resistance (dustproofness) but also high waterproofness. The sound-permeable membrane 1 formed using the non-porous film 11 has higher waterproofness, for example, than a sound-permeable membrane as disclosed in JP 2007-81881 A which is based on a porous sheet. Porous sheets can exhibit only a limited level of waterproofness. A porous sheet cannot prevent permeation of water vapor, although the porous sheet with an adjusted average pore diameter may have the potential to block most of fine dust. With the use of a porous sheet, a phenomenon substantially corresponding to water entry can occur due to condensation of permeated water vapor.

The non-porous film 11 is formed of oriented PTFE. A sound-permeable membrane formed using a non-porous film of PTFE is disclosed, for example, in JP 2011-78089 A. A non-porous film disclosed as a concrete example in this literature is a PTFE film obtained by skiving (skived film). In the skived film, PTFE is substantially non-oriented. In terms of acoustic properties necessary for sound-permeable membranes, such as a low insertion loss, they are required to have a certain small thickness, in particular a thickness of 20 μm or less. Thus, mere skived films of PTFE are susceptible to the formation of wrinkles, locally-thinned portions, and pinholes. The occurrence of these defects leads to a decrease in the waterproofness of the films as sound-permeable membranes. In the sound-permeable membrane 1 of the present invention, the non-porous film 11 is formed of oriented PTFE. The non-porous film 11 formed of oriented PTFE has a higher strength and suffers less from uneven thickness and/or pinhole formation than mere skived PTFE films. These features contribute to the high waterproofness of the sound-permeable membrane 1. For example, a microphone including such a sound-permeable membrane 1 has a low risk of generating noise or experiencing failure due to entry of foreign matters including water into the sound transducer of the microphone and is highly reliable.

Another of the excellent properties is high heat resistance. The sound-permeable membrane 1 exhibits high heat resistance attributed to PTFE. The sound-permeable membrane 1 is thus compatible, for example, with reflow soldering and can at the same time have high waterproofness. JP 2011-78089 A, which discloses a sound-permeable membrane formed using a non-porous film, takes no account of the compatibility of the sound-permeable membrane with reflow soldering. The compatibility with reflow soldering will now be described in detail.

In electronic device manufacturing, the reflow soldering has become increasingly used to mount electronic components on printed boards. The reflow soldering is a process in which a solder in the form of a viscous paste is printed on that portion of a printed board which is to be soldered, an electronic component is placed on the printed solder, and then a high temperature is applied to melt the solder to mount the component on the board. This process is advantageous in terms of mass production of printed circuit boards (PCBs) having a printed board with electronic components mounted thereon and in terms of the reliability of the PCBs to be produced, and is adapted for automation of mounting steps. The electronic components include audio parts (audio elements) such as microphones and speakers used in electronic devices. Condenser microphones, which have hitherto been widely used in electronic devices, include an organic electret, and the reflow soldering which involves application of high temperatures is inapplicable to such microphones. However, microphones, such as those employing microelectromechanical systems (MEMS) technology, which are resistant to property degradation induced by a temporarily-applied high temperature and thus for which the reflow soldering is applicable have recently come to be used. Under such circumstances, sound-permeable membranes are also required to be compatible with the reflow soldering which is carried out in mounting of an audio element on a printed board and/or in production of the audio element itself. The sound-permeable membrane 1 is adapted to meet such a demand and, for example, can be used in a production process including the reflow soldering or can be mounted on an electronic device or on a component such as a printed board of an electronic device by using the reflow soldering. In addition, the sound-permeable membrane 1 allows an audio part or electronic device including a sound-permeable membrane to be produced using the reflow soldering. The sound-permeable membrane 1 thus offers a significant benefit in industrial production of the components and devices as mentioned above.

The non-porous film 11 is formed of oriented PTFE. As is typical in the field of polymers, the term "orientation" is used herein to refer to the orientation of the molecular chain (PTFE chain in this embodiment). The orientation of the PTFE can be confirmed, for example, by X-ray diffraction (XRD) measurement. Specifically, for example, the film is subjected to wide-angle X-ray diffraction (WAXD) measurement to obtain an X-ray diffraction pattern (WAXD profile), from which whether PTFE is oriented in the film (whether the film is formed of oriented PTFE) can be determined. The WAXD measurement allows the determination of the degree of orientation of PTFE in the film. The direction of orientation of PTFE is not particularly limited. An example of the orientation of PTFE in the non-porous film 11 is orientation in one in-plane direction such as the MD direction (MD direction in film production) of the non-porous film 11. The degree of orientation of PTFE in the non-porous film 11 is, for example, 80% or more and can be 85% or more, or even 88% or more.

The term "non-porous" is used herein to mean that there are no pores extending through a film from one principal surface of the film to the other principal surface of the film. For example, a film having an air permeability of zero can be considered a non-porous film.

The non-porous film 11 formed of oriented PTFE can be fabricated, for example, by calendering a PTFE film. In this case, the non-porous film 11 is a calendered film of PTFE. The PTFE film to be calendered can be formed by a known technique and is, for example, a PTFE film formed by casting or skiving (cast film or skived film). The PTFE film to be subjected to calendering is preferably sintered.

An example of forming a PTFE film by casting will now be described. An aqueous dispersion of PTFE (in which the concentration of PTFE particles is, for example, 60 mass %; this concentration can be varied) is applied to one side of a carrier sheet. The carrier sheet is, for example, a polyimide sheet. Next, the entire carrier sheet with the applied dispersion is heated at 90° C. for 2 minutes and then at 360° C. for 2 minutes to evaporate and remove water that is the dispersion medium of the PTFE dispersion. In this manner, a PTFE film is formed on the carrier film, and the formed film is sintered. The application of the dispersion onto the carrier film and the drying and sintering by the multi-stage heating may be repeated twice or more if necessary. Such repetition can increase the thickness of the PTFE film. The heating temperature and time can be varied. A sintered PTFE film can be formed in the foregoing manner.

An example of forming a PTFE film by skiving will now be described. A molding powder of PTFE (various molding powders are commercially-available) is charged into a mold having a cylindrical inner cavity, and a pressure of 280 kgf/cm$^2$ (27.5 MPa) is applied to give a preformed product. Next, the resulting preformed product is sintered by heating at 340° C. for 24 hours. The circumferential surface of the resulting cylindrical sintered product of PTFE is then stripped into a film. A sintered PTFE film can thus be formed. The pressure, heating temperature, and heating time employed in preforming can be varied.

The method for calendering the PTFE film is not limited. The calendering method is, for example, press calendering or roll calendering. The press calendering is, for example, hot plate calendering in which the PTFE film is pressed between a pair of heated plates and thus calendered under heating. In roll calendering, for example, the PTFE film is passed between a pair of rolls (one or both of which is or are heated) and thus calendered under heating. Of the two calendering methods, roll calendering is more preferred, since with the use of roll calendering, it is easier to achieve control of the direction of orientation of PTFE, such as control for aligning the direction of orientation, and also since roll calendering allows the PTFE film in the form of a strip to be continuously calendered. The calendering may be repeated twice or more if necessary, and the calendering direction may be the same for all the repetitions or different for each repetition. The heating temperature employed in the calendering of the PTFE film is, for example, 80 to 200° C.

Figure 1B:
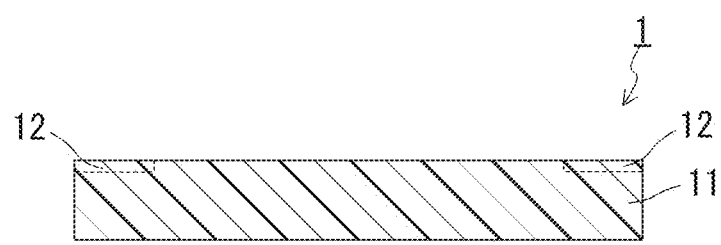
FIG. 1B is a cross-sectional view schematically showing another example of the sound-permeable membrane of the present invention.

FIG. 1B shows another example of the sound-permeable membrane of the present invention. In the sound-permeable membrane 1 shown in FIG. 1B, at least one principal surface of the non-porous film 11 has a region (surface-modified region) 12 subjected to a surface modification treatment. In this case, the sound-permeable membrane 1 can exhibit further improved waterproofness during use.

The waterproofness obtained by the use of the sound-permeable membrane in an audio part such as a microphone or speaker or in an electronic device is firstly based on the above-discussed waterproofness of the sound-permeable membrane itself. When the sound-permeable membrane is securely joined, for example, to a member included in an audio part such as a microphone and/or to a member included in an electronic device, the sound-permeable membrane 1 can provide further improved waterproofness during use. Even if secure joining is achieved in production of an audio part such as a microphone and/or of an electronic device, the joining may become loose during use of the audio part and/or electronic device so that water comes in through the loose portion. In this case, the waterproofness provided by the sound-permeable membrane is said to be practically poor. This phenomenon may be attributed to the low bond strength characteristic of PTFE and to the fact that the sound-permeable membrane is a non-porous film made of such a material having a low bond strength. The sound-permeable membrane 1 shown in FIG. 1B has an enhanced joining strength at its surface-modified region 12. Thus, for example, secure joining between the sound-permeable membrane 1 and the member as mentioned above can be achieved by joining the sound-permeable membrane 1 at its region 12 to the member. The secure joining prevents entry of water through the joining portion, thereby enabling the sound-permeable membrane to provide high waterproofness during use.

The embodiment shown in FIG. 1B can provide both improvement in the waterproofness of the sound-permeable membrane itself and improvement in waterproofness derived from enhanced joining strength between the sound-permeable membrane and a member to which the sound-permeable membrane is joined. The member to which the sound-permeable membrane 1 is joined is not limited, and may be a member composing (included in) an audio part and/or electronic device. Specifically, the member is, for example, a component such as a package (housing) of a microphone and/or speaker, a housing of an electronic device, an electronic device case used for enclosing an electronic device, or a printed board. Considering the high heat resistance of PTFE, it is possible to obtain a sound-permeable membrane that is compatible with reflow soldering and that provides high waterproofness during the use of an audio part and/or electronic device including the sound-permeable membrane.

The surface modification treatment is not limited, as long as the treatment improves the joining strength as discussed above. The treatment is, for example, a PTFE modification treatment such as a chemical treatment or sputter etching treatment.

The chemical treatment is, for example, a treatment using an alkali metal such as sodium (alkali metal treatment). In the alkali metal treatment, for example, an etchant containing metallic sodium and the PTFE film are brought into contact, and this contact induces withdrawal of fluorine atoms and hence formation of functional groups in the portion (corresponding to the region 12) of the film that has contacted the etchant, thus leading to enhanced joining strength. To bring the etchant and the PTFE film into contact, the PTFE film may be dipped in the etchant. In this case, for example, a portion of a principal surface of the PTFE film may be masked so that the region 12 is formed in another portion (unmasked portion) of the principal surface of the PTFE film.

The etchant is, for example, a metallic sodium/liquid ammonia solution containing metallic sodium dissolved in liquid ammonia or a metallic sodium/naphthalene solution containing metallic sodium dissolved in a naphthalene solution. Of these two solutions, the metallic sodium/naphthalene solution is preferred, since this solution is easy to control and handle and also since it allows the treatment to be carried out without the need for a low temperature of around −50° C.

In the sputter etching treatment, a surface of the PTFE film is bombarded with energy particles derived from a gas. Atoms or molecules are emitted from the surface of the particle-bombarded portion of the film, and this results in the formation of functional groups in the portion, leading to enhanced joining strength. The sputter-etching treatment is carried out, for example, by placing the PTFE sheet in a chamber, then reducing the pressure inside the chamber, and subsequently applying a high-frequency voltage while introducing an atmosphere gas. In this case, for example, a portion of a principal surface of the PTFE film may be masked so that the region 12 is formed in another portion (unmasked portion) of the principal surface of the PTFE film.

Examples of the atmosphere gas include: noble gases such as helium, neon, argon, and krypton; nitrogen; and oxygen. The atmosphere gas may be a mixture of these gases. The frequency of the high-frequency voltage applied is, for example, 1 to 100 MHz and preferably 5 to 50 MHz. The pressure inside the chamber during the application of the high-frequency voltage is, for example, 0.05 to 200 Pa and preferably 1 to 100 Pa. The sputter etching energy (corresponding to the treatment time multiplied by the applied voltage) is, for example, 1 to 1000 $J/cm^2$ and preferably 2 to 200 $J/cm^2$.

Figure 2:
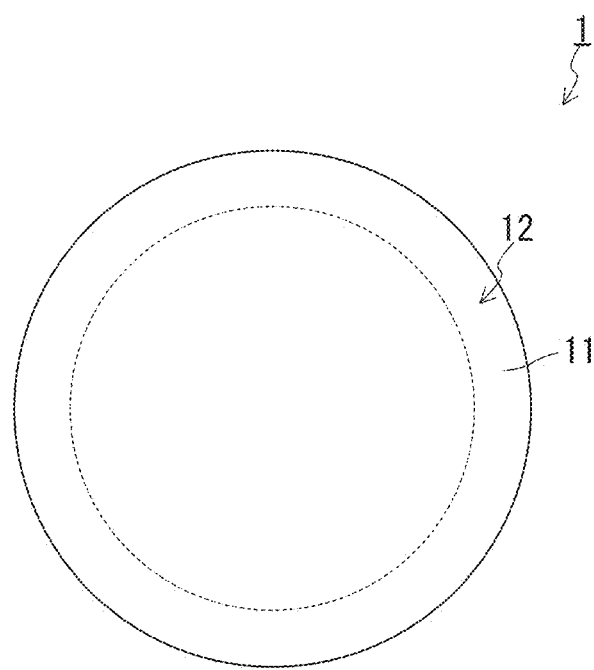
FIG. 2 is a plan view schematically showing another example of the sound-permeable membrane of the present invention.

When the region 12 is formed, the region 12 is formed in at least one principal surface of the non-porous film 11 and may be formed in both principal surfaces of the film. The shape of the region 12 is not particularly limited, and may be formed over the entire principal surface of the non-porous film 11 or in a portion of the principal surface. Given the function of the sound-permeable membrane 1, it is preferable to form the region 12 in that portion of the non-porous film 11 at which the sound-permeable membrane 1 is joined to another member or in that portion of the non-porous film 11 which overlaps a portion at which the sound-permeable membrane 1 is joined to another member. The portion is, for example, the peripheral portion of the non-porous film 11. That is, when the region 12 is formed, it is preferable that the region 12 be formed in the peripheral portion of at least one principal surface of the non-porous film 11. An example of such a sound-permeable membrane 1 is shown in FIG. 2. FIG. 2 is a schematic diagram showing the sound-permeable membrane 1 as seen in a direction perpendicular to its principal surfaces. In the example shown in FIG. 2, the region 12 in the shape of a ring is formed in the peripheral portion of one principal surface of the non-porous film 11 that is in the shape of a circle.

If the sound-permeable membrane 1 is a single-layer membrane consisting of the non-porous film 11 having the region 12 formed therein, this means that the region 12 is formed in at least one principal surface of the sound-permeable membrane 1. When the sound-permeable membrane 1 is a multilayer membrane including the non-porous film 11 and consisting of two or more non-porous films, the region 12 is formed in at least one of the non-porous films. When the sound-permeable membrane 1 is a multilayer membrane including the non-porous film 11 having the region 12 formed therein, the non-porous film 11 may not be directly joined to another member. Even in this case, the presence of the region 12 increases the joining strength between the non-porous film 11 and its adjacent layer, with the result that the improving effect on waterproofness can be obtained during use. The adjacent layer may have a similar surface-modified region formed therein.

In producing the non-porous film 11 having the region 12 formed therein, the order in which the process for orienting the PTFE chain and the surface modification treatment are performed is not limited. Given that the process for orienting the PTFE chain, in particular the calendering process, may reduce the improving effect of the surface modification treatment on the joining strength, it is preferable to carry out the process for orienting PTFE first and then the surface modification treatment. In other words, when producing the non-porous film 11 having the region 12 formed therein, it is preferable to carry out the surface modification treatment on the calendered PTFE film.

The sound-permeable membrane 1 may include two or more non-porous films 11. In this case, the non-porous films 11 may have the same configurations or different configurations. In terms of the acoustic properties of the sound-permeable membrane 1, in particular the reduction in insertion loss, it is preferable for the sound-permeable membrane 1 to be a single-layer membrane consisting of the non-porous film 11 as shown in FIG. 1A, FIG. 1B, and FIG. 2.

The sound-permeable membrane 1 may further include a member other than the non-porous film 11, as long as the effects of the present invention are obtained. The member is, for example, an air-permeable supporting member laminated to the non-porous film 11. The air-permeable supporting member is a air-permeable layer that supports the non-porous film 11 and serves to increase the strength of the sound-permeable membrane 1. The air-permeable supporting member is typically a woven fabric, non-woven fabric, mesh, net, sponge, foam, or porous body made of a metal, resin, or composite thereof. Examples of the resin include polyolefin, polyester, polyamide, polyimide, aramid, fluorine resin, and ultrahigh molecular weight polyethylene. The lamination of the air-permeable supporting member to the non-porous film 11 can be accomplished by joining them using any of various joining techniques such as thermal lamination, heat welding, and ultrasonic welding. When the sound-permeable membrane 1 includes a air-permeable supporting member containing a resin, it is preferable, in terms of compatibility with reflow soldering, that the resin be one selected from polyamide, polyimide, aramid, and fluorine resin which have high heat resistance.

The sound-permeable membrane 1 may include two or more air-permeable supporting members. In this case, the order of the arrangement of the layers inclusive of the non-porous film 11 is not limited. In terms of the acoustic properties of the sound-permeable membrane 1, it is preferable for the sound-permeable membrane 1 to consist of the non-porous film 11 as shown in FIG. 1A, FIG. 1B, and FIG. 2. From another standpoint, it is preferable that in the sound-permeable membrane 1, the non-porous film 11 be uncovered. In this case, the sound-permeable membrane 1 has improved acoustic properties. The uncovering of the non-porous film 11 is such that at least one principal surface of the film is uncovered and may be such that both principal surfaces of the film are uncovered. In these cases, that portion of the non-porous film 11 which is to be joined to another member, such as the peripheral portion of the non-porous film, may not be uncovered. That is, it is preferable that the non-porous film 11 be uncovered, except for the portion to be joined to another member.

The surface density of the sound-permeable membrane 1 is preferably 30 $g/m^2$ or less and more preferably 15 $g/m^2$ or less. The surface density of the sound-permeable membrane 1 has influence on the acoustic properties of the membrane. When the sound-permeable membrane 1 is a single-layer membrane consisting of the non-porous film 11, the value range specified above corresponds to the preferred range of the surface density of the non-porous film 11. The other features of the sound-permeable membrane 1, which will be described below, are also those of the non-porous film 11 when the sound-permeable membrane 1 is a single-layer membrane consisting of the non-porous film 11. The surface density is calculated as "mass of membrane/area of principal surface of membrane"; that is, the surface density is the mass of the membrane per unit area of its principal surfaces.

The thickness of the sound-permeable membrane 1 is not particularly limited. When the sound-permeable membrane 1 is a single-layer membrane consisting of the non-porous film 11 and has a surface density of 30 g/m$^2$ or less, the thickness of the membrane is, for example, 1 to 20 μm.

The sound-permeable membrane 1 can have acoustic properties such that an average insertion loss in the frequency range of 100 to 5000 Hz is less than 5 dB, 3 dB or less, or even 2 dB or less. The sound-permeable membrane 1 having such good acoustic properties functions as a sound-permeable membrane that, when in use, i.e., when placed over an opening for directing sound to a sound transducer of an audio part, allows the audio part to exhibit good performance. The insertion loss as defined herein refers to a value representing a change in sound pressure (sound pressure loss) that sound experiences when passing through the evaluation object (the sound-permeable membrane herein). For the sound-permeable membrane 1, the insertion loss at a frequency of 1000 Hz (for sound with a frequency of 1000 Hz) can be less than 5 dB, 3 dB or less, or even 2 dB or less. The frequencies ranging from 100 to 5000 Hz are those to which human hearing is highly sensitive. The sound-permeable membrane transmits sound by their own vibration; thus, the insertion loss measured in a predetermined frequency range (the measurement method will be described later in Examples) can take a negative value. In this case, given that it is ideal for sound-permeable membranes to have an "insertion loss of 0 (zero) dB", the increase or decrease in insertion loss may be evaluated on the basis of the absolute value of the measured insertion loss, and the average insertion loss mentioned above and the "difference between the maximum and minimum" as described below may be determined.

The sound-permeable membrane 1 allows sound transmitted through the membrane to maintain its properties even when the membrane has a reduced effective area. Specifically, even when the membrane has a reduced effective area, the insertion loss for sound transmitted through the membrane can be made flat (less fluctuated) over a broad frequency range such as the frequency range of 100 to 5000 Hz. This advantageous feature is attributable to the fact that the non-porous film 11 is formed of oriented PTFE. The effective area of the sound-permeable membrane 1 may be, for example, 4 mm$^2$ or less, 3 mm$^2$ or less, or even 2 mm$^2$ or less. When the effective area is in such a range, the difference between the maximum and minimum of the insertion loss of the sound-permeable membrane 1 in the frequency range of 100 to 5000 Hz can be, for example, 15 dB or less, 10 dB or less, 5 dB or less, 3 dB or less, or even 1 dB or less. In the case of a conventional sound-permeable membrane, such as a sound-permeable membrane disclosed in JP 2007-81881 A, which is based on a porous PTFE membrane, the above feature cannot be achieved, and the difference as defined above is very large. In other words, when such a conventional sound-permeable membrane has a reduced effective area, the insertion loss for sound transmitted through the membrane cannot be made flat (less fluctuated) over a broad frequency range. The effective area of the sound-permeable membrane 1 refers to the area of the portion (effective portion) of the membrane through which, when the membrane is placed to cover an opening such as a sound inlet port, sound actually enters the membrane, travels in the membrane, and exits the membrane. For example, the effective area does not include the area of a supporting member and/or bonding portion placed on or formed in the peripheral portion of the sound-permeable membrane 1 for placement of the membrane. The effective area typically corresponds to the area of the opening over which the membrane is placed. The effective area of a sound-permeable membrane member including the sound-permeable membrane 1 and a supporting member placed on the peripheral portion of the membrane 1 can be equal to the area of an opening portion of the supporting member. The effective area can also be equal to the area of the below-described sound transmission hole over which the membrane has been placed.

In recent years, there has been a growing trend for openings (including sound transmission holes) of electronic devices, over which sound-permeable membranes are to be placed, to become increasingly smaller due to a narrowed available space associated with reduction in size and/or thickness of the electronic devices and due to an increased demand for improvement in visual appearance which greatly influences the sales of the devices. This trend is particularly significant for portable electronic devices. The smaller an opening over which a sound-permeable membrane is to be placed, the narrower the effective area of the sound-permeable membrane. A decrease in the effective area of the sound-permeable membrane causes deterioration in the properties of sound transmitted through the sound-permeable membrane; for example, the insertion loss of the sound-permeable membrane increases. It goes without saying that the increase in insertion loss is desirably as small as possible. When the increase in insertion loss is inevitable, it is desirable for the value of the increased insertion loss to be flat over a broad frequency range. This is because the broader the frequency range over which the insertion loss is flat, the easier it is to correct the sound transmitted through the sound-permeable membrane, typically by means of a software. The previously-described features achieved by the sound-permeable membrane 1 are therefore highly advantageous, and the advantageous features contribute to reduction in size, reduction in thickness, and increase in flexibility in visual appearance and design, of an audio part, electronic device, or electronic device case which includes the sound-permeable membrane 1.

It is preferable that the water entry pressure measured for the sound-permeable membrane 1 according to Method B (high hydraulic pressure method) of water penetration test specified in JIS L 1092 be 400 kPa or more. In the measurement of the water entry pressure, a stainless steel mesh having openings with a diameter of 2 mm may be placed on one side of the membrane opposite to its surface subjected to pressure, in order to reduce the change in shape of the membrane.

In addition, the sound-permeable membrane 1 can maintain its water pressure resistance better than conventional sound-permeable membranes, even if continuously exposed to water pressure. Even after continuously exposed to water pressure, the sound-permeable membrane 1 can maintain good acoustic properties, examples of which include those described above such as the lowness of the average insertion loss and/or the flatness of the insertion loss over a broad frequency range. That is, the sound-permeable membrane 1 can have a high ability to maintain the water resistance. This advantageous feature is attributable to the fact that the non-porous film 11 is formed of oriented PTFE. More specifically, the membrane is expected to successfully resist deformation even when continuously exposed to water pressure. The ability to maintain the water resistance can be evaluated, for example, by a continuous water pressure loading test. The continuous water pressure loading test is a test in which a predetermined water pressure is continuously applied to the sound-permeable membrane for a predetermined time. The continuous water pressure loading test can be conducted using a water penetration test apparatus specified in JIS L 1092, similarly to the measurement of the water entry pressure. The sound-permeable membrane 1 can be a membrane that does not suffer breakage and/or water leakage even when, for example, a water pressure of 300 kPa is continuously applied to the membrane for 10 minutes.

The sound-permeable membrane 1 may be subjected to a coloring treatment. The non-porous film 11 of the sound-permeable membrane 1 is formed of PTFE, and is white when not subjected to any coloring treatment. The sound-permeable membrane 1 can thus be white. Such a sound-permeable membrane 1 may be conspicuous when the membrane 1 is placed over an opening of an audio part such as a microphone or over an opening of a housing of an electronic device. Such a conspicuous membrane may so stimulate the curiosity of a user as to induce the user to stab the membrane with a needle or the like, thereby impairing the function of the membrane as a sound-permeable membrane. When the sound-permeable membrane 1 has been subjected to a coloring treatment so that, for example, the sound-permeable membrane 1 has a color identical or similar to the color of the housing of the electronic device, the possibility of attracting the user's attention can be relatively reduced. In some cases, a colored sound-permeable membrane is required in view of the visual appearance of the housing. Such a requirement as to visual appearance can be met by means of the coloring treatment.

The coloring treatment can be carried out, for example, by dyeing the non-porous film 11 or by incorporating a colorant into the non-porous film 11. The coloring treatment may be carried out, for example, so as to enable absorption of light in the wavelength range of 380 nm to 500 nm. That is, the sound-permeable membrane 1 may be subjected to a coloring treatment that enables the sound-permeable membrane 1 to absorb light in the wavelength range of 380 nm to 500 nm. To this end, for example, the non-porous film 11 contains a colorant having the ability to absorb light in the wavelength range of 380 nm to 500 nm or is dyed with a dye having the ability to absorb light in the wavelength range of 380 nm to 500 nm. In this case, the sound-permeable membrane 1 can be colored blue, gray, brown, pink, green, yellow, or the like. The sound-permeable membrane 1 may be colored black, gray, brown, or pink by a coloring treatment.

The method for using the sound-permeable membrane 1 (how to attach or place the sound-permeable membrane 1) in, for example, an audio part, electronic device, or electronic device case is not limited.

The specific application of the sound-permeable membrane 1 is not limited, and the sound-permeable membrane 1 can be, for example, a sound-permeable membrane for a speaker, a sound-permeable membrane for a microphone, a sound-permeable membrane for an electronic device, a sound-permeable membrane for an electronic device case, a sound-permeable membrane for a circuit board (typically a printed board), or a sound-permeable membrane for a sound transmission structure.

[Sound-Permeable Membrane Member]

Figure 3A:
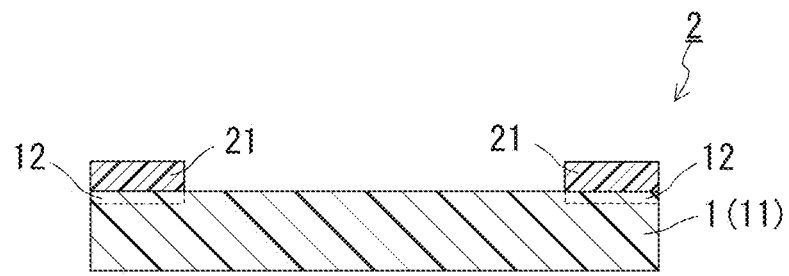
FIG. 3A is a cross-sectional view schematically showing an example of the sound-permeable membrane member of the present invention.
Figure 3B:
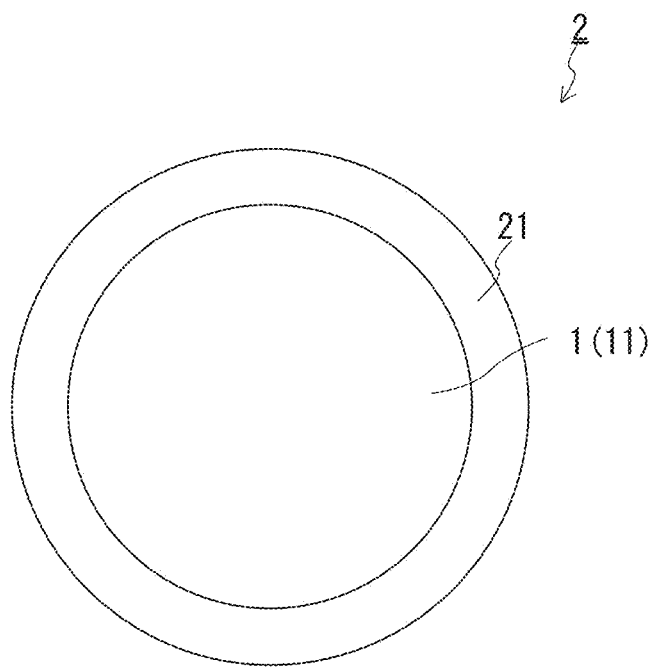
FIG. 3B is a plan view of the sound-permeable membrane member of FIG. 3A as seen in a direction perpendicular to the principal surfaces of the member.

FIGS. 3A and 3B show an example of the sound-permeable membrane member of the present invention. FIG. 3B shows the sound-permeable membrane member of FIG. 3A as seen in a direction perpendicular to the principal surfaces of the sound-permeable membrane included in the member. The sound-permeable membrane member 2 shown in FIGS. 3A and 3B includes: the sound-permeable membrane 1 shown in FIG. 1B which includes the non-porous film 11 having the surface-modified region 12 formed in at least one principal surface thereof, and a bonding portion 21 placed on a peripheral portion of the one principal surface of the sound-permeable membrane 1 to join the sound-permeable membrane 1 to another member. The sound-permeable membrane 1 is adapted, when placed over an opening for directing sound to a sound transducer, to prevent entry of foreign matters into the sound transducer through the opening while permitting passage of sound. The sound-permeable membrane 1 is identical to the sound-permeable membrane described above in the section entitled "[Sound-permeable membrane]", and the effect of the sound-permeable membrane 1 can be obtained also for the sound-permeable membrane member 2. For example, the sound-permeable membrane member 2 exhibits high dustproofness and waterproofness. A microphone including such a sound-permeable membrane member 2 has a low risk of generating noise and/or experiencing failure due to entry of foreign matters into the sound transducer of the microphone and is highly reliable. In addition, for example, the sound-permeable membrane member 2 can be made compatible with reflow soldering depending on the configuration of the bonding portion 21.

The sound-permeable membrane member 2 of the present invention may include the sound-permeable membrane 1 shown in FIG. 1A which includes the non-porous film 11 (non-porous film 11 having no surface-modified region 12 formed therein); and the bonding portion 21 placed on a peripheral portion of at least one principal surface of the sound-permeable membrane 1. When, as shown in FIG. 3A, the non-porous film 11 has the region 12 formed in at least one principal surface thereof, the sound-permeable membrane member 2 exhibits further improved waterproofness during use.

The bonding portion 21 is placed on at least one principal surface of the sound-permeable membrane 1 and may be placed on both principal surfaces of the sound-permeable membrane 1. It is preferable for the bonding portion 21 to be placed on the region 12. This provides a further improvement in waterproofness. In this case, the bonding portion 21 may be placed on at least a portion of the region 12.

The shape of the bonding portion 21 is not particularly limited. For example, the bonding portion 21 has a shape defining one or more closed areas inside the bonding portion 21, and an example of such a shape is a ring shape as shown in FIG. 3A and FIG. 3B. Given the function of the sound-permeable membrane 1, the bonding portion 21 is placed typically on a peripheral portion of the sound-permeable membrane 1. That is, it is preferable for the bonding portion 21 to be placed on a peripheral portion of one principal surface of the sound-permeable membrane 1.

The sound-permeable membrane 1 (sound-permeable membrane member 2) can be joined to another member via the bonding portion 21.

The non-porous film 11 of the sound-permeable membrane 1 may be uncovered, as shown in FIG. 3A and FIG. 3B. The non-porous film 11 of the sound-permeable membrane 1 may be uncovered, and the bonding portion 21 may be placed on the region 12 formed in the uncovered surface of the non-porous film 11.

The constituent of the bonding portion 21 is not limited. For example, the bonding portion 21 is formed of a double-coated (pressure-sensitive) adhesive tape or an adhesive. Given the use of reflow soldering, the double-coated adhesive tape is preferably a thermosetting adhesive tape, and the adhesive is preferably an epoxy adhesive. The bonding portion 21 formed of the adhesive is preferably an adhesive sheet in terms of the ease of placement on the sound-permeable membrane 1.

The sound-permeable membrane member 2 of the present invention may further include any member other than the sound-permeable membrane 1 and bonding portion 21, as long as the effects of the present invention are obtained. The member is, for example, a supporting member or printed board.

The supporting member is placed, for example, on the bonding portion 21. In this case, the sound-permeable membrane 1 and the supporting member can be said to be joined together by the bonding portion 21. Joining the supporting member to the sound-permeable membrane 1 reinforces the sound-permeable membrane 1 and also improves its handling properties. Additionally, when the sound-permeable membrane member 2 is placed over an object such as an opening of a package and/or housing, the supporting member can serve as a portion attached to the object and thus can make easier the attachment of the sound-permeable membrane 1.

The shape of the supporting member is not limited. For example, the shape of the supporting member corresponds to the shape of the peripheral portion of the sound-permeable membrane 1, and a specific example of the shape is that of the bonding portion 21 shown in FIG. 3B. Conforming the shape of the supporting member to the shape of the peripheral portion of the sound-permeable membrane 1 reduces the deterioration in the acoustic properties of the sound-permeable membrane 1 caused by the placement of the supporting member. It is preferable for the supporting member to be in the form of a sheet, in terms of improving the handling properties of the sound-permeable membrane member 2 and the ease of placement of the member 2 over an opening.

Examples of the material forming the supporting member include resins, metals, and composites thereof. Examples of the resins include: polyolefins such as polyethylene and polypropylene; polyesters such as PET and polycarbonate; polyimides; and composites of these resins. Examples of the metals include metals having high corrosion resistance such as stainless steel and aluminum.

The thickness of the supporting member is, for example, 5 to 500 μm and preferably 25 to 200 μm. In particular, in view of its function as the portion for attachment, the appropriate width of the supporting member (e.g., the ring width (the difference between the outer size and inner size) of the supporting member that has a ring shape identical to the shape of the bonding portion 21 shown in FIG. 3B) is about 0.5 to 2 mm. A foamed material made of any of the resins mentioned above may be used as the supporting member.

When the sound-permeable membrane member 2 further includes the supporting member, the sound-permeable membrane member 2 may further include a bonding portion placed on the supporting member.

The sound-permeable membrane member 2 can include two or more bonding portions and/or two or more supporting members.

The printed board includes a printed circuit board (PCB) including a substrate and an electronic component mounted on the substrate. The printed board may be, for example, a flexible printed board. An example of such a case is shown in FIG. 4.

Figure 4:
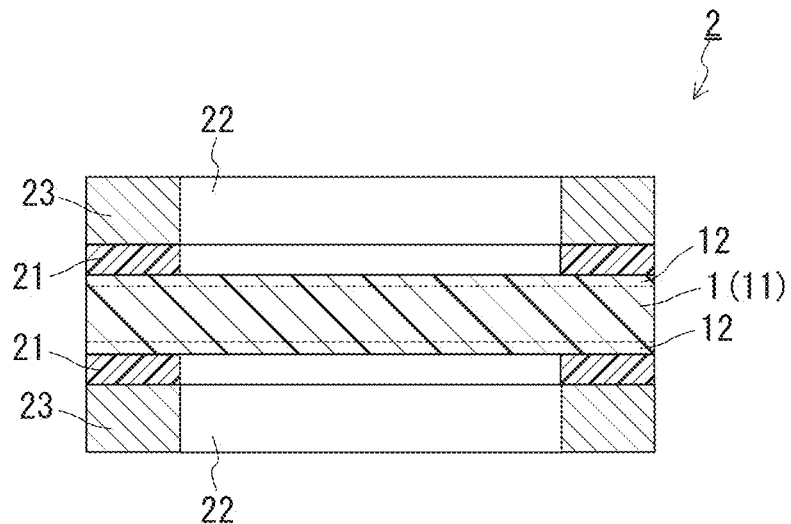
FIG. 4 is a cross-sectional view schematically showing another example of the sound-permeable membrane member of the present invention.

The sound-permeable membrane member 2 shown in FIG. 4 includes the sound-permeable membrane 1 and the bonding portions 21 and further includes printed boards 23 each provided with a sound transmission hole 22 which is an opening. The bonding portions 21 are respectively placed on both principal surfaces of the sound-permeable membrane 1, in particular on the respective peripheral portions of the principal surfaces. Each bonding portion 21 is placed on the region 12 of the corresponding principal surface. In the example shown in FIG. 4, the region 12 is formed over the entirety of each principal surface of the sound-permeable membrane 1, and the bonding portion 21 is placed on a portion of the region 12. In the sound-permeable membrane member 2, the sound-permeable membrane 1 is held between the pair of printed boards 23, and the sound-permeable membrane 1 and the printed boards 23 are united together via the bonding portions 21 in such a manner as to allow sound to pass through the sound transmission holes 22 and sound-permeable membrane 1.

The bonding portions 21 need not be placed on the regions 12. It should be noted, however, that when the sound-permeable membrane 1 and the printed boards 23 are united together via the bonding portions 21 as in the sound-permeable membrane member 2 shown in FIG. 4, more secure joining between the sound-permeable membrane 1 and the printed boards 23 can be achieved. The printed boards 23 can be readily joined to a component of an audio part such as a microphone or to a component of an electronic device. Thus, the sound-permeable membrane member 2 shown in FIG. 4 exhibits high waterproofness during use, similarly to the sound-permeable membrane member 2 shown in FIGS. 3A and 3B. Additionally, the sound-permeable membrane member 2 shown in FIG. 4 is compatible with reflow soldering.

Furthermore, in the case of the sound-permeable membrane member 2 shown in FIG. 4, audio parts such as a microphone and speaker can be formed on the printed boards 23. It should be understood that the reflow soldering can be employed for the formation of the audio parts. For example, when a microphone is formed on the printed board 23, the microphone is formed in such a manner as to allow sound to pass through the sound transmission hole 22 of the printed board 23, the sound-permeable membrane 1, and the sound inlet port of the microphone. In addition, in the case of the sound-permeable membrane member 2 shown in FIG. 4, the printed board 23 can be joined to a member such as a housing of an electronic device. The joining between the printed board 23 and the housing of the electronic device is done in such a manner as to allow sound to pass through an opening of the housing of the electronic device, the sound transmission hole 22 of the printed board 23, and the sound-permeable membrane 1.

The sound-permeable membrane member shown in FIG. 4 can be regarded as an assembly of a sound-permeable membrane and printed boards or as a printed board equipped with a sound-permeable membrane. When an electronic component is mounted on any of the printed boards of the sound-permeable membrane member shown in FIG. 4, the sound-permeable membrane member can be regarded as an electronic component equipped with a sound-permeable membrane or as an electronic circuit equipped with a sound-permeable membrane.

The printed boards 23 each having the sound transmission hole 22 can be formed by a known method. The joining between the printed boards 23 and the sound-permeable membrane 1 can be carried out by a known method using the bonding portions 21.

The method for using the sound-permeable membrane member 2 (how to attach or place the sound-permeable membrane member 2) in, for example, an audio part, electronic device, or electronic device case is not limited.

The specific application of the sound-permeable membrane member 2 is not limited, and the sound-permeable membrane member 2 can be, for example, a sound-permeable membrane member for a speaker, a sound-permeable membrane member for a microphone, a sound-permeable membrane member for an electronic device, a sound-permeable membrane member for an electronic device case, a sound-permeable membrane member for a circuit board (typically a printed board), or a sound-permeable membrane member for a sound transmission structure.

Hereinafter, examples of applying the sound-permeable membrane 1 and sound-permeable membrane member 2 will be described.

[Microphone]

Figure 5:
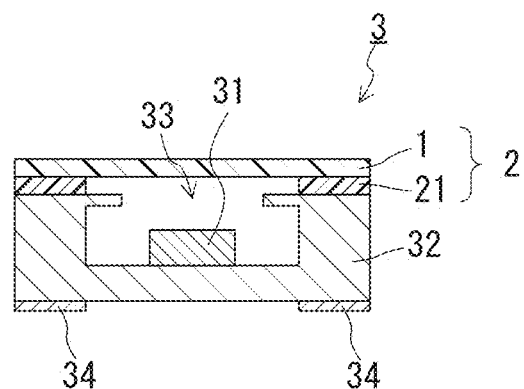
FIG. 5 is a cross-sectional view schematically showing an example of the microphone of the present disclosure.

FIG. 5 shows an example of the microphone of the present disclosure. The microphone 3 shown in FIG. 5 is a so-called microphone unit including a package (housing) 32 and a sound transducer 31 enclosed in the package 32 to transduce sound into an electrical signal. The package 32 has a hollow interior and is provided at its one side with a sound inlet port 33 for directing sound from outside to the sound transducer 31. The sound-permeable membrane 1 of the present invention is joined to the package 32 via the bonding portion 21 so as to cover the sound inlet port 33. The bonding portion 21 is placed on the peripheral portion of one principal surface of the sound-permeable membrane 1, in particular on the region 12 of the sound-permeable membrane 1. The sound-permeable membrane 1 is uncovered, except for the bonding portion 21. The sound-permeable membrane 1 and the bonding portion 21 form together the sound-permeable membrane member 2 of the present invention. The bottom surface of the package 32 is provided with a pair of terminals 34 for outputting the electrical signal resulting from transduction of sound by the sound transducer 31. To implement the microphone 3, for example, the microphone 3 is mounted on a printed board of an electronic device or, more specifically, the terminals 34 are electrically connected to the printed board.

In the microphone 3, the sound-permeable membrane 1 of the present invention which is placed to cover the sound inlet port 33 prevents entry of foreign matters such as dust and water into the sound transducer 31 through the sound inlet port 33 while permitting passage of sound to the sound transducer 31, and thus reduces the generation of noise and the occurrence of failure, thereby allowing the microphone to maintain its performance. In addition, the microphone 3 can be produced, or mounted on a printed board of an electronic device, by reflow soldering, and at the same time can be endowed with high waterproofness. Such a microphone has a reduced risk of generating noise or experiencing failure and is highly reliable. Furthermore, the microphone exhibits high waterproofness during use, since the bonding portion 21 is placed on the region 12 of the sound-permeable membrane 1. Besides, the effects described above for the sound-permeable membrane 1 can also be obtained.

The structure of the sound transducer 31 is not particularly limited. When the microphone 3 is a condenser microphone (electret condenser microphone: ECM), the sound transducer 31 includes a diaphragm and a backplate (back electrode), and the vibration of the diaphragm caused by sound coming in the sound transducer 31 is transduced into an electrical signal. The same applies to the case where the microphone 3 is a silicon microphone.

The structure and material of the package 32 are not particularly limited. The package 32 is typically formed of a resin. The package 32 typically has only the sound inlet port 33 as an opening. The manner of enclosure of the sound transducer 31 in the package 32, the shape and size of the package 32, the shape and size of the sound inlet port 33, the distance between the sound inlet port 33 and sound transducer 31, and the shape of the terminals 34 are not particularly limited.

Figure 6:
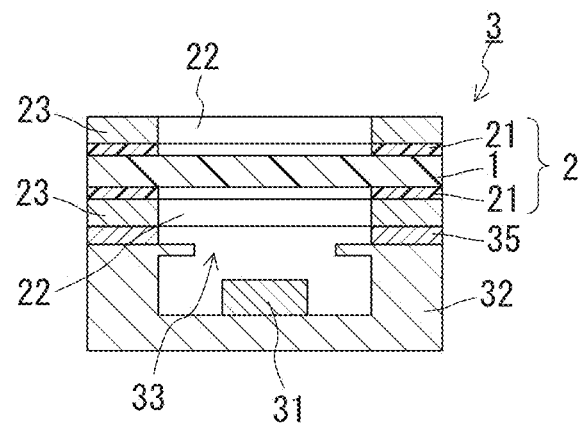
FIG. 6 is a cross-sectional view schematically showing another example of the microphone of the present disclosure.

Another example of the microphone of the present disclosure is shown in FIG. 6. The microphone 3 shown in FIG. 6 includes a sound-permeable membrane member 2 (the sound-permeable membrane member 2 shown in FIG. 4) in which the sound-permeable membrane 1 is held between a pair of printed boards 23, the sound-permeable membrane 1 being joined to the package 32 to cover the sound inlet port 33. The joining between the sound-permeable membrane member 2 and the package 32 in the example shown in FIG. 6 can be accomplished by a known method such as a method for mounting a microphone on the printed board 23. A specific example of the method is solder mounting, in the case of which reflow soldering can be employed. When solder mounting is employed, the numeral 35 in FIG. 6 denotes a solder joint.

[Electronic Device Including Microphone]

Figure 7:
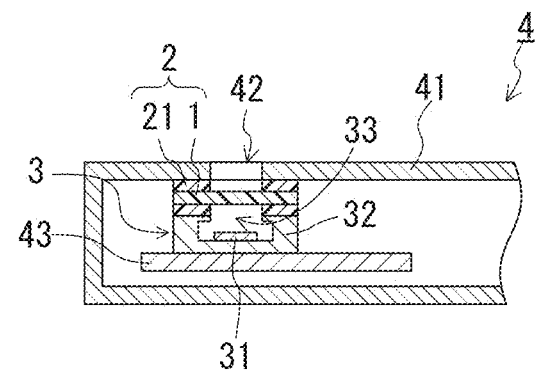
FIG. 7 is a cross-sectional view schematically showing an example of the electronic device of the present disclosure (electronic device including a microphone).

An example of a mobile phone (smartphone) as the electronic device including the microphone of the present disclosure is shown in FIG. 7. FIG. 7 shows a cross-section of the mobile phone, inclusive of the microphone 3.

The mobile phone 4 shown in FIG. 7 has a housing 41, in which the microphone (microphone unit) 3 is enclosed. The housing 41 is provided with a sound inlet port 42 for directing sound from outside to the microphone 3. The sound transducer 31 for transducing sound into an electrical signal is enclosed in the package 32 of the microphone 3. The package 32 has a hollow interior and is provided at its one side with the sound inlet port 33 for directing sound coming through the sound inlet port 42 of the housing 41 to the sound transducer 31 of the microphone 3. The sound-permeable membrane 1 of the present invention is joined to the package 32 and housing 41 via the bonding portions 21 so as to cover their respective sound inlet ports 33 and 42. The bonding portions 21 are placed on the respective peripheral portions of both principal surfaces of the sound-permeable membrane 1, in particular on the regions 12 of the sound-permeable membrane 1. The sound-permeable membrane 1 is uncovered, except for the bonding portions 21. The sound-permeable membrane 1 and the bonding portions 21 form together the sound-permeable membrane member 2 of the present invention. The microphone 3 is electrically connected to a circuit board 43 of the mobile phone 4 by a terminal (not shown) provided on the bottom surface of the package 32, and the electrical signal resulting from transduction of sound by the sound transducer 31 is output to the circuit board 43 via the terminal.

In the mobile phone 4, the sound-permeable membrane 1 placed to cover the sound inlet ports 33 and 42 prevents entry of dust or water into the sound transducer 31 of the microphone 3 through the sound inlet ports 33 and 42 while permitting passage of sound to the sound transducer 31, and thus reduces the generation of noise and the occurrence of failure, thereby allowing the mobile phone 4 to maintain its microphone performance. In addition, the mobile phone 4 allows the microphone to be mounted by reflow soldering, and can be configured as an electronic device including a microphone endowed with high waterproofness. Such an electronic device is highly reliable in terms of the microphone performance. Furthermore, the electronic device exhibits high waterproofness during use, since the bonding portions 21 are placed on the regions 12 of the sound-permeable membrane 1. Besides, the effects described above for the sound-permeable membrane 1 can also be obtained.

In the example shown in FIG. 7, the sound-permeable membrane 1 is joined to both the package 32 and housing 41 so as to cover the sound inlet port 33 of the package 32 and the sound inlet port 42 of the housing 41. The sound-permeable membrane 1 may be joined to at least one member selected from the package 32 and the housing 41 so as to cover at least one of the sound inlet ports, as long as the sound-permeable membrane 1 can prevent entry of foreign matters into the sound transducer 31 while permitting passage of sound to the sound transducer 31.

The manner of enclosure of the microphone 3 in the mobile phone 4 is not limited to that in the example shown in FIG. 7.

Figure 8:
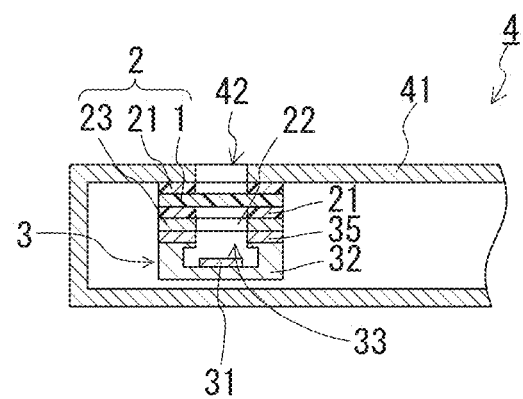
FIG. 8 is a cross-sectional view schematically showing another example of the electronic device of the present disclosure (electronic device including a microphone).

Another example of the electronic device (electronic device including a microphone) of the present disclosure is shown in FIG. 8. The mobile phone (smartphone) 4 shown in FIG. 8 includes the sound-permeable membrane member 2 including the printed board 23 and the sound-permeable membrane 1 laminated together, the sound-permeable membrane 1 being joined to the package 32 and the housing 41 to cover the sound inlet ports 33 and 42. The joining between the sound-permeable membrane member 2 and the package 32 in the example shown in FIG. 8 can be accomplished by a known method such as a method for mounting a microphone on the printed board 23. A specific example of the method is solder mounting, in the case of which reflow soldering can be employed. When solder mounting is employed, the numeral 35 in FIG. 8 denotes a solder joint. The joining between the sound-permeable membrane member 2 and the housing 41 in the example shown in FIG. 8 is accomplished via the bonding portions 21 of the sound-permeable membrane member 2.

The electronic device of the present disclosure is not limited to a mobile phone such as a smartphone or feature phone. The electronic device may be, for example, a digital camera, digital video camera, portable television, transceiver, voice recorder, or wearable terminal or may be a specific electronic device which will be described later. The microphone of the present disclosure may be a microphone unit externally attached to any of these electronic devices.

Other Examples of Application

The sound-permeable membrane 1 and sound-permeable membrane member 2 of the present invention are applicable to sound emitters such as a speaker, although the foregoing has described specific examples of their application to microphones. In the case of application to a speaker, the sound transducer is at least one of the components of the speaker.

Figure 9A:
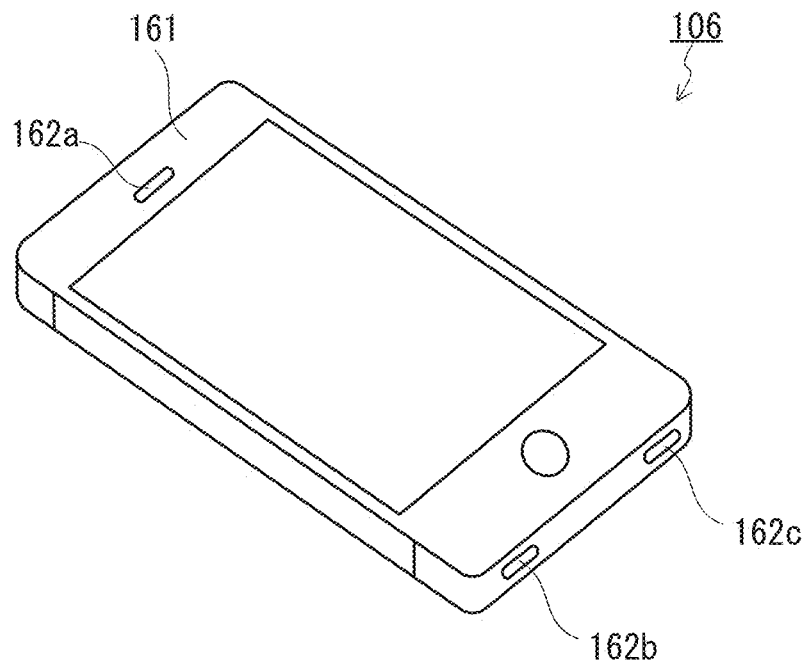
FIG. 9A is a perspective view schematically showing an example of the electronic device of the present disclosure.
Figure 9B:
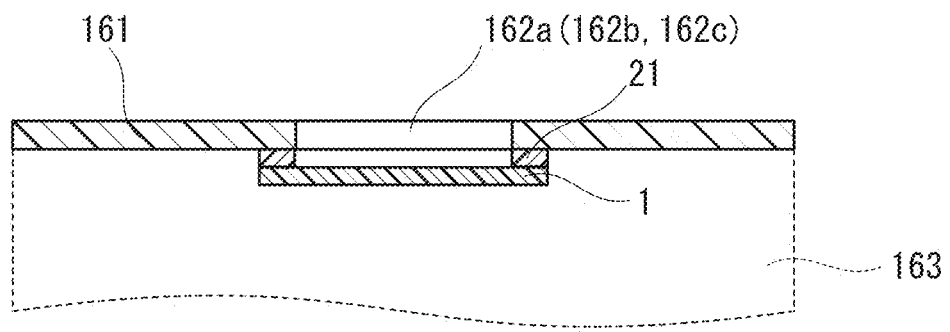
FIG. 9B is a cross-sectional view schematically showing an example of how a sound-permeable membrane is placed in the electronic device of the present disclosure.

An example of the electronic device of the present disclosure is shown in FIG. 9A. The electronic device shown in FIG. 9A is a smartphone which is a type of mobile phone. The smartphone 106 has a housing 161, and the housing 161 has an opening 162a provided in proximity to a transducer which is a type of sound emitting/receiving device, an opening 162b provided in proximity to a microphone which is a type of sound receiver, and an opening 162c provided in proximity to a speaker which is a type of sound emitter. Sound is transmitted between the outside of the smartphone 106 and the audio parts (the transducer, microphone, and speaker) enclosed in the housing 161 through the openings 162a to 162c. As shown in FIG. 9B, the smartphone 106 includes the sound-permeable membranes 1 of the present invention that are attached inside the housing 161 so as to cover the openings 162a to 162c. It is thus possible to prevent entry of foreign matters such as water from outside into the housing 161 through the openings while permitting sound transmission between the outside of the smartphone 106 and the audio parts. Besides, the effects described above for the sound-permeable membrane 1 can also be obtained.

Where and how to place the sound-permeable membranes 1 in the electronic device 106 of the present disclosure are not limited, as long as the openings provided in the housing 161 of the device 106 are covered by the sound-permeable membranes 1. In the example shown in FIG. 9B, each sound-permeable membrane 1 is joined to the housing 161 via the bonding portion 21 (that is, the sound-permeable membrane member 2 is joined to the housing). For the placement of the sound-permeable membranes 1 inside the electronic device 106, techniques such as thermal welding, high-frequency welding, and ultrasonic welding can also be employed.

The housing 161 is formed of a resin, metal, glass, or composite thereof. The display screen of the electronic device 106 may constitute a part of the housing 161, as in smartphones and tablet computers.

The electronic device of the present disclosure is not limited to the smartphone 106. Electronic devices that fall under the category of the electronic device of the present disclosure include all types of electronic devices that include an audio part, that have a housing provided with an opening for sound transmission between the outside of the housing and the audio part, and that allow the sound-permeable membrane 1 to be placed to cover the opening. Examples of the electronic device of the present disclosure include: mobile phones such as feature phones and smartphones; mobile computers such as tablet computers, wearable computers, PDAs, game consoles, and notebook computers; electronic notebooks; digital cameras; video cameras; and electronic book readers.

[Electronic Device Case]

Figure 10A:
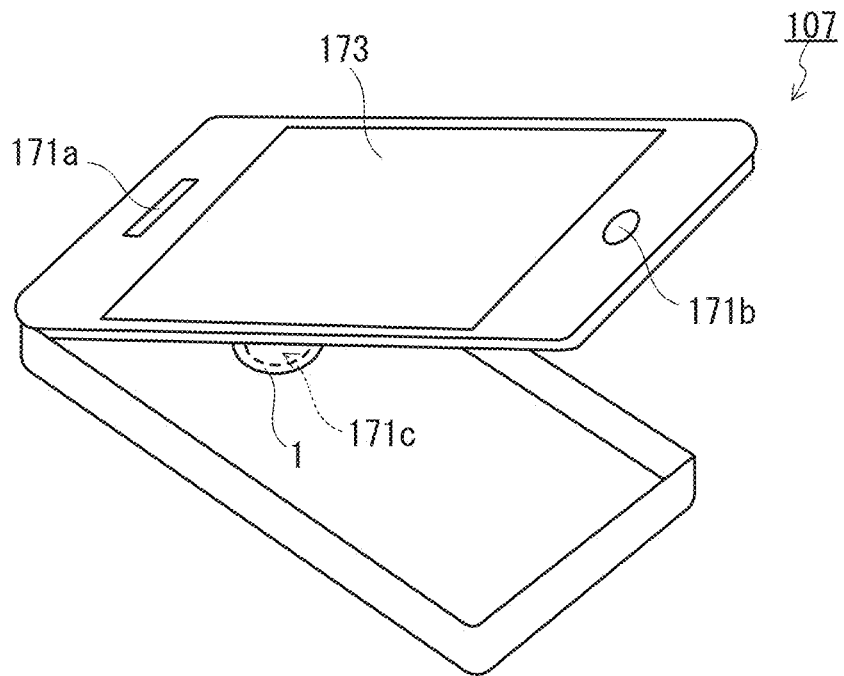
FIG. 10A is a perspective view schematically showing an example of the electronic device case of the present disclosure.
Figure 10B:
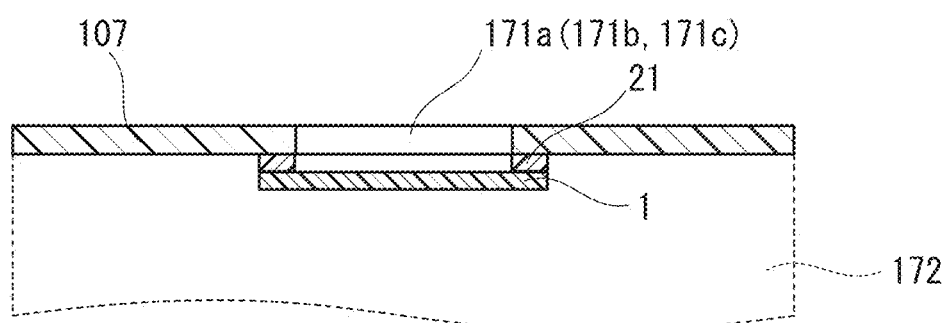
FIG. 10B is a cross-sectional view schematically showing an example of how a sound-permeable membrane is placed in the electronic device case of the present disclosure.

An example of the electronic device case of the present disclosure is shown in FIG. 10A. The case 107 shown in FIG. 10A is provided with openings 171a to 171c for sound transmission between the outside of the case 107 and audio parts of an electronic device enclosed in the case 107. The case 107 shown in FIG. 10A is a case for a smartphone differing in type from the smartphone 106 shown in FIG. 9A. The opening 171a is provided for sound transmission to the voice receiver of the smartphone, the opening 171b is provided for sound transmission to the voice transmitter of the smartphone, and the opening 171c is provided for sound transmission from the speaker of the smartphone to the outside. As shown in FIG. 10B, the case 107 further includes the sound-permeable membrane 1 placed to cover the opening 171a (171b, 171c). This sound-permeable membrane 1 can prevent foreign matters such as water from entering an interior 172 of the case 107, and consequently the inside of the electronic device enclosed in the interior 172 of the case 107, from the outside of the case 107 through the opening 171a (171b, 171c) while permitting sound transmission between the audio parts of the electronic device and the outside. Besides, the effects described above for the sound-permeable membrane 1 can also be obtained.

How to place the sound-permeable membrane 1 in the electronic device case 107 of the present disclosure is not limited, as long as the opening (opening portion) 171a (171b, 171c) is covered by the membrane 1. In the example shown in FIG. 10B, the sound-permeable membrane 1 is joined to the case 107 in its interior 172 via the bonding portion 21 (that is, the sound-permeable membrane member 2 is joined to the case). For the placement of the sound-permeable membrane 1 in the case 107, techniques such as thermal welding, high-frequency welding, and ultrasonic welding can also be employed. The sound-permeable membrane 1 can be placed on the exterior of the case 107.

The electronic device case 107 is formed of a resin, metal, glass, or composite thereof. The electronic device case 107 can have any configuration, as long as the effects of the present invention are obtained. For example, the case 107 shown in FIG. 10A is a case for a smartphone and includes a film 173 that enables external operation of a touch panel of the smartphone enclosed in the case.

[Sound Transmission Structure]

Figure 11:
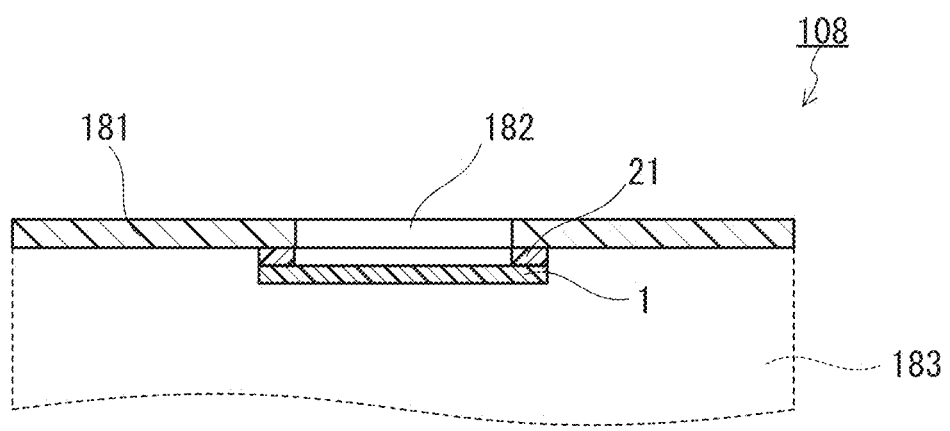
FIG. 11 is a cross-sectional view schematically showing an example of the sound transmission structure of the present disclosure.

An example of the sound transmission structure of the present disclosure is shown in FIG. 11. The sound transmission structure 108 shown in FIG. 11 includes: a housing 181 having an interior 183 and provided with an opening 182 for sound transmission between the interior 183 and the outside of the housing 181; and the sound-permeable membrane 1 placed to cover the opening (opening portion) 182. This sound-permeable membrane 1 can prevent foreign matters such as water from entering the housing 181 from the outside through the opening 182 while permitting sound transmission between the outside of the housing 181 and the interior 183. Besides, the effects described above for the sound-permeable membrane 1 can also be obtained.

Such a sound transmission structure 108 can be used in various applications.

In the example shown in FIG. 11, the sound-permeable membrane 1 is joined to the housing 181 via the bonding portion 21. In other words, the sound-permeable membrane member 2 including the sound-permeable membrane 1 and bonding portion 21 is joined to the housing 181. The sound-permeable membrane 1 may be joined to the exterior of the housing 181, although in the example shown in FIG. 11, the membrane 1 is joined to the housing 181 in the interior 183 of the housing 181.

The housing 181 is formed of a resin, metal, glass, or composite thereof.

For the placement of the sound-permeable membrane 1, techniques such as thermal welding, high-frequency welding, and ultrasonic welding can also be employed.

The component, device, equipment, product or the like that can have the sound transmission structure 108 is not limited.

The sound transmission structure 108 can be used in various applications similarly to conventional sound transmission structures.

EXAMPLES

Hereinafter, the present invention will be described in more detail by examples. The present invention is not limited to the examples given below.

First, the methods for evaluation of the sound-permeable membranes fabricated in the present examples will be described.

[Thickness]

The thickness of each sound-permeable membrane was determined by punching circular pieces of 48 mm diameter out of the sound-permeable membrane, measuring the total thickness of 10 such pieces placed on top of each other with a micrometer, and calculating $1/10$ of the measured value.

[Surface Density]

The surface density of each sound-permeable membrane was determined by punching a circular piece of 48 mm diameter out of the sound-permeable membrane, measuring the mass of the circular piece, and calculating the mass of the circular piece per 1 $m^2$ of its principal surfaces from the measured mass.

[Strength at Break]

The strength at break of each sound-permeable membrane was determined by punching a dumbbell specimen as specified in JIS K 6251 (No. 3 dumbbell specimen) out of the sound-permeable membrane and subjecting the specimen to a tensile test (tensile speed: 300 mm/min) using a desktop precision universal testing machine, Autograph AGS-X (manufactured by Shimadzu Corporation). The tensile direction was the MD direction of the sound-permeable membranes fabricated in the examples.

[Bond Strength]

The bond strength of the surface of each sound-permeable membrane was determined as follows.

Each membrane was cut into a 19 mm×150 mm piece, to the surface of which an adhesive tape (No. 31, manufactured by NITTO DENKO CORPORATION) including an acrylic adhesive was attached at room temperature. In attaching the adhesive tape, a roller weighing 2 kg was pressed against the adhesive tape and moved back and forth once to securely attach the adhesive tape to the piece of membrane. The combined product of the piece of membrane and the adhesive tape was then left for 30 minutes in an atmosphere employed for the bond strength measurement, specifically an atmosphere with a temperature of 23° C. and a relative humidity of 50%. After that, the product was subjected to a 180° peel test, in which the adhesive tape was pulled at a tensile speed of 300 mm/min with the membrane being fixed. In this manner, the bond strength of the surface of the sound-permeable membrane was determined.

[Bond Strength Expected to be Exhibited after Reflow Soldering]

The bond strength expected to be exhibited by each sound-permeable membrane after reflow soldering was determined as follows. The membrane and a flexible printed board were compressed and bonded together using a thermosetting adhesive tape (NA 592, manufactured by NITTO DENKO CORPORATION); the compression bonding was performed by first using a laminator (temperature: 130° C., pressure: 0.3 MPa, speed: 0.5 m/min), then a pressing machine (temperature: 160° C., pressure: 3 MPa, time: 90 seconds), and finally a drying oven (temperature: 150° C., curing time: 3 hours). Next, the resulting compression-bonded product was subjected to a simplified reflow test simulating actual reflow soldering, the test consisting of five cycles in each of which the compression-bonded product was placed in a drying oven held at a temperature of 260° C. for 1 minute. The compression-bonded product was taken out of the drying oven after the test, then cooled to room temperature, and subsequently cut into a 20 mm×150 mm piece, which was subjected to a 180° peel test in which the flexible printed board was pulled at a tensile speed of 300 mm/min with the membrane being fixed. In this manner, the ability of the sound-permeable membrane to maintain the surface bond strength under heat expected to be applied to the membrane during reflow soldering was determined.

[Water Entry Pressure]

The water entry pressure was determined for each sound-permeable membrane according to Method B (high hydraulic pressure method) of water penetration test specified in JIS L 1092. If a specimen of the membrane has an area specified in this standard, the membrane undergoes a significant change in shape. Thus, in order to reduce the change in shape of the membrane to some extent, a stainless steel mesh (opening diameter=2 mm) was placed on one side of the membrane opposite to its surface subjected to pressure, and in this state the measurement was performed.

[Insertion Loss]

The insertion loss of each sound-permeable membrane was evaluated as follows using a simulated housing imitating a housing of a mobile phone.

Figure 12:
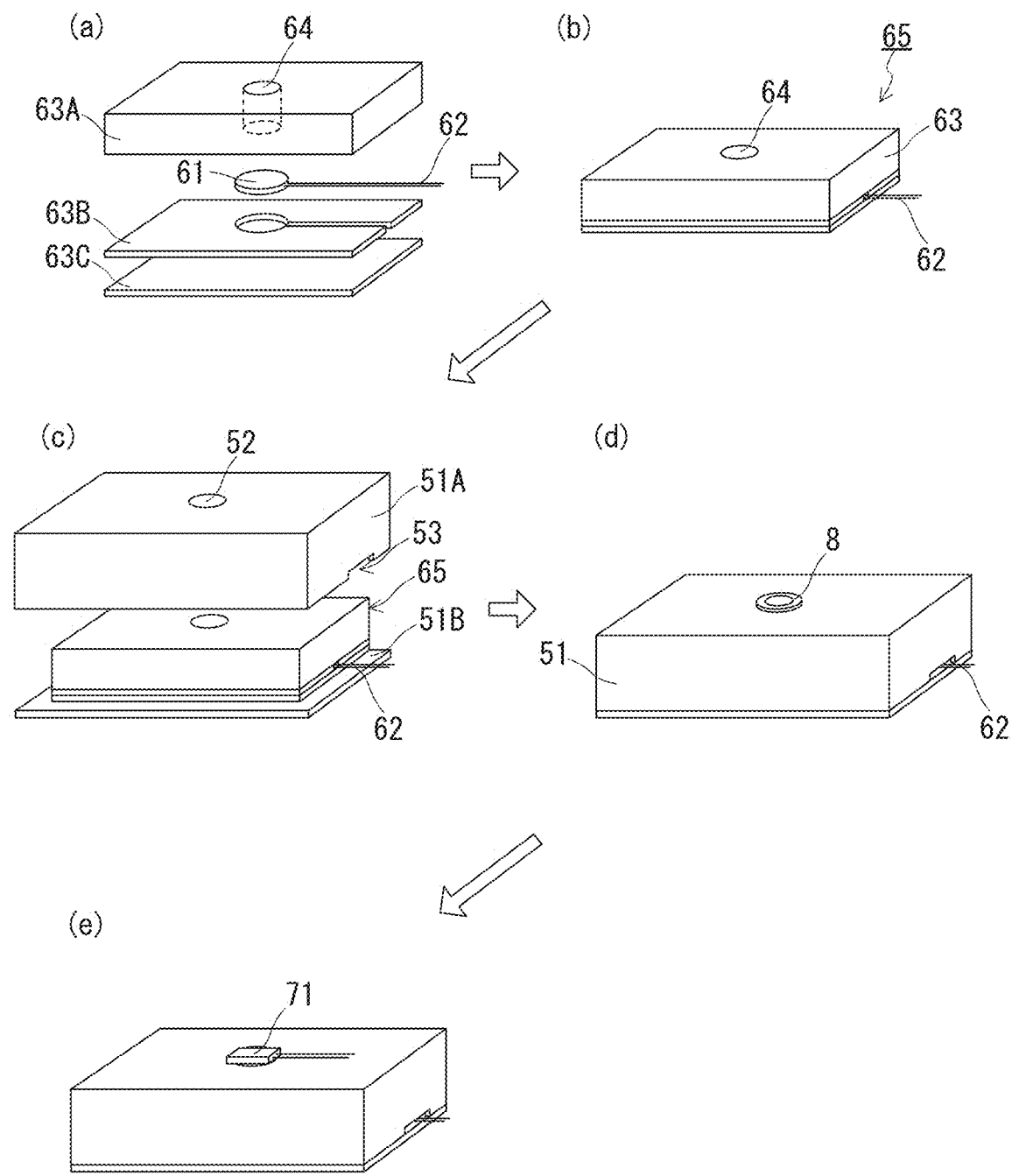
FIG. 12 is a schematic diagram illustrating how to prepare a simulated housing for evaluation of the insertion loss of sound-permeable membranes in examples.

A speaker unit 65 to be enclosed in the simulated housing was fabricated first, as shown in (a) and (b) of FIG. 12. The details will now be described. First, the following were prepared: a speaker 61 (SCC-16A, manufactured by STAR MICRONICS CO., LTD) to be used as a sound source; and fillers 63A, 63B, and 63C made of urethane sponge for enclosing the speaker 61 and minimizing diffusion of sound from the speaker (for preventing generation of sound entering the microphone for evaluation without passing through the sound-permeable membrane). The filler 63A is provided with a sound transmission hole 64 having a cross-section in the shape of a 5-mm-diameter circle and extending in the thickness direction of the filler 63A. The filler 63B is provided with a cutout conforming to the shape of the speaker 61 to be placed therein and a cutout for placing a speaker cable 62 therein and leading the cable 62 to the outside of the unit 65. Next, the fillers 63C and 63B were placed on top of each other, and the speaker 61 and cable 62 were placed in the cutouts of the filler 63B, after which the filler 63A was placed on the filler 63B in such a manner as to allow sound to be transmitted from the speaker 61 to the outside of the unit 65 through the sound transmission hole 64. The speaker unit 65 was thus obtained (see (b) of FIG. 12).

Next, as shown in (c) of FIG. 12, the speaker unit 65 fabricated as above was placed inside a simulated housing 51 (made of polystyrene and having outer dimensions of 60 mm×50 mm×28 mm) imitating a housing of a mobile phone. The details will now be described. The simulated housing 51 prepared consists of two parts 51A and 51B, and the parts 51A and 51B are able to be fitted to each other. The part 51A is provided with a sound transmission hole 52 (having a cross-section in the shape of a 2-mm-diameter circle) for transmitting sound emitted from the speaker unit 65 enclosed in the housing 51 to the outside of the housing 51 and a guide hole 53 for leading the speaker cable 62 to the outside of the housing 51. When the parts 51A and 51B are fitted together, a space having no openings other than the sound transmission hole 52 and the guide hole 53 is created inside the housing 51. The fabricated speaker unit 65 was placed on the part 51B, and the part 51A was then placed over the unit 65 and fitted to the part 51B. The unit 65 was thus enclosed in the housing 51. This was done in such a manner that the sound transmission hole 64 of the unit 65 and the sound transmission hole 52 of the part 51A overlapped each other to allow sound to be transmitted from the speaker 61 to the outside of the housing 51 through both of the sound transmission holes 64 and 52. The speaker cable 62 was led to the outside of the housing 51 through the guide hole 53, and the guide hole 53 was filled with putty.

Meanwhile, a specimen 83 in the shape of a 5.8-mm-diameter circle was punched using a Thomson die out of each of the sound-permeable membranes fabricated in Examples and Comparative Examples. Next, a ring-shaped double-coated adhesive tape 82 (No. 5603, manufactured by NITTO DENKO CORPORATION, having a thickness of 0.03 mm, and including a base material of polyethylene terephthalate (PET)) with an outer diameter of 5.8 mm and an inner diameter of 2.5 mm was joined to a peripheral portion of one principal surface of the specimen 83, and a ring-shaped double-coated adhesive tape 84 (No. 57120B, manufactured by NITTO DENKO CORPORATION, having a thickness of 0.20 mm, and including a base material of polyethylene foam) with an outer diameter of 5.8 mm and an inner diameter of 2.5 mm was joined to a peripheral portion of the other principal surface of the specimen 83. The joining was done in such a manner that the entire outer peripheries of the specimen and tapes exactly overlapped each other. Next, a ring-shaped PET sheet 81 (having a thickness of 0.1 mm) having the same outer diameter and inner diameter as mentioned above was joined to the surface of the double-coated adhesive tape 82 remote from the specimen 83 in such a manner that the entire outer peripheries of the PET sheet 81 and the double-coated adhesive tape 82 exactly overlapped each other. A laminate 8 was thus obtained (see FIG. 13). In the laminate 8, the region inside the ring defined by the ring-shaped PET sheet 81 and double-coated adhesive tapes 82 and 84 serves as a sound transmission hole in which sound passes through the specimen 83.

Figure 13:
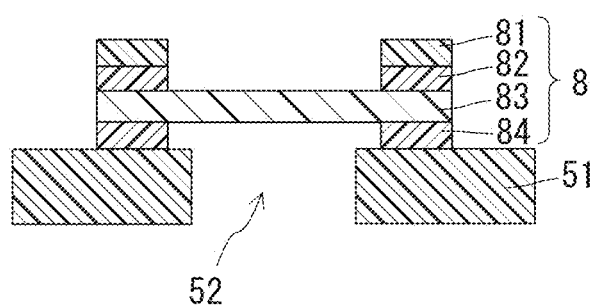
FIG. 13 is a cross-sectional view schematically showing a laminate including a sound-permeable membrane which was prepared for evaluation of the insertion loss of sound-permeable membranes in examples.

Next, as shown in (d) of FIG. 12 and FIG. 13, the laminate 8 including the specimen 83 was fixedly attached over the sound transmission hole 52 of the housing 51 via the double-coated adhesive tape 84. This was done in such a manner that the specimen 83 fully covered the sound transmission hole 52 and that any gap was formed neither between the members constituting the laminate 8 nor between the double-coated adhesive tape 84 and the housing 51. The double-faced tape 84 was placed so as not to overlap the sound transmission hole 52. The effective area of the sound-permeable membrane (specimen) was 4.9 mm$^2$, which corresponds to the area of a 2.5-mm-diameter circle.

Next, as shown in (e) of FIG. 12, a microphone 71 (Spm 0405Hd4H-W8 manufactured by Knowles Acoustics) was placed to cover the laminate 8 including the specimen 83. The distance between the microphone 71 thus placed and the speaker 61 was 21 mm. The speaker 61 and the microphone 71 were then connected to an acoustic evaluation system (Multi-analyzer System 3560-B-030 manufactured by B&K Sound & Vibration Measurement A/S). SSR (Solid State Response) mode (test signals of 20 Hz to 20 kHz, sweep up) was selected as an evaluation mode and carried out to evaluate the insertion loss of the sound-permeable membrane specimen 83. The insertion loss was automatically determined on the basis of a test signal input to the speaker 61 from the acoustic evaluation system and a signal received by the microphone 71. To evaluate the insertion loss of the specimen 83, the value (blank value) of insertion loss which would be obtained when the sound-permeable membrane were removed by breaking the specimen 83 included in the laminate 8 was determined beforehand. The blank value was −21 dB at a frequency of 1000 Hz. The insertion loss of the sound-permeable membrane corresponds to a value calculated by subtracting the blank value from the value measured by the acoustic evaluation system. A smaller insertion loss indicates better maintenance of the level (volume) of the sound output from the speaker 61. This test method can yield a graph representing the relationship of the insertion loss of the specimen versus sound frequency and, for example, the insertion loss of the specimen at a given frequency can be determined from the graph.

Besides the above evaluation in which the effective area was set to 4.9 mm², the insertion loss was determined for the cases where the effective area of the sound-permeable membrane was set to 2 mm² and 3.1 mm² by adjusting the inner diameters of the ring-shaped PET sheet 81 and ring-shaped double-coated adhesive tapes 82 and 84 to 1.6 mm and 2.0 mm.

[Continuous Water Pressure Loading Test]

A continuous water pressure loading test was carried out as follows. As in the evaluation method for water entry pressure, this test was conducted according to Method B of water penetration test specified in JIS L 1092 by applying a water pressure of 200 kPa or 300 kPa to a specimen of each sound-permeable membrane for 10 minutes, with a stainless steel mesh (opening diameter=2 mm) being placed on one side of the membrane opposite to its surface subjected to pressure. A rating of "Poor" was given when this water pressure loading caused breakage of the sound-permeable membrane or water leakage from the sound-permeable membrane, while when neither breakage nor water leakage occurred, a rating of "Good" was given. In addition, the sound-permeable membranes having undergone the continuous water pressure loading test were subjected to the above insertion loss evaluation, and the change in insertion loss at a frequency of 1 kHz before and after the continuous water pressure loading test was determined. The insertion loss evaluation subsequent to the continuous water pressure loading test was carried out 12 hours after the end of the test, with the effective area of the membrane set to 3.1 mm².

[Degree of Orientation of PTFE]

The degree of orientation (degree of crystal orientation) of PTFE in each sound-permeable membrane was determined as follows. The sound-permeable membrane was fixed with a holder in such a manner as to allow recognition of the MD direction of the membrane (MD direction in membrane production), and a transmission WAXD pattern (a two-dimensional image in reciprocal space) of the membrane was obtained. Whether PTFE was oriented in the sound-permeable membrane was determined from the obtained WAXD pattern, and the degree of orientation of PTFE was determined using the following equation (1).

Degree of orientation (%)=(1−ΣFWHM/360)×100(%)  (1)

In the equation (1), ΣFWHM denotes a half-value width (in units of degrees) in a circumferential direction of a peak attributed to the crystal structure of PTFE and observed at a diffraction angle 2θ of around 18° in the obtained WAXD pattern. When PTFE is non-oriented, the peak in the WAXD pattern takes the shape of a ring having a radius corresponding to 2θ=18°. In this case, since the peak is distributed over the entire circumference of the ring, ΣFWHM is 360° and the degree of orientation as calculated by the equation (1) is 0%. As PTFE becomes oriented, the ring-shaped peak appearing in the WAXD pattern is divided and concentrated at specific portions of the ring according to the direction of orientation so that the value of ΣFWHM decreases. That is, the degree of orientation as calculated by the equation (1) increases. In addition, the direction of orientation in the sound-permeable membrane can be determined on the basis of where the peaks are concentrated.

The conditions employed in the WAXD measurement were as follows.

X-ray diffractometer
D8 Discover with GADDS Super Speed, manufactured by Bruker AXS
Emitting-side optical system
X ray: CuKα ray (λ=0.1542 nm), Monochromator: Multilayer mirror, Collimator: 300 μm
Voltage applied to Cu target: 50 kV
Current applied to Cu target: 100 mA
Receiving-side optical system
Counter: Two-dimensional position sensitive proportional counter (PSPC) (Hi-STAR, manufactured by Bruker AXS)
Camera distance: 9 cm
Measurement time: 10 minutes Example 1

To a PTFE dispersion (containing 40 mass % of a PTFE powder with an average particle diameter of 0.2 μm and containing 6 parts by mass of a nonionic surfactant relative to 100 parts by mass of PTFE) there was added a fluorinated surfactant (Megaface F-142D manufactured by DIC Corporation) in an amount of 1 part by mass relative to 100 parts by mass of PTFE. After the addition, a strip-shaped polyimide film (thickness: 125 μm) was dipped in, and withdrawn from, the PTFE dispersion to form a coating of the PTFE dispersion on the film. The thickness of the coating was controlled to 20 μm by means of a metering bar. Next, the entire film with the coating was heated at 100° C. for 1 minute and then at 390° C. for 1 minute to evaporate and thereby remove water from the dispersion and at the same time to bind the remaining PTFE powder particles together and thereby form a PTFE film. The dipping and heating were further repeated twice, after which the PTFE film was separated from the polyimide film to obtain a cast PTFE film (thickness: 25 μm).

Next, the entireties of both principal surfaces of the cast film obtained were subjected to a chemical surface modification treatment by dipping the cast film in an etchant containing metallic sodium (TETRA-ETCH manufactured by Junkosha Inc.) for 5 seconds. After that, the film was taken out of the etchant and washed with acetone and water. Next, the cast film subjected to the surface modification treatment was calendered by a rolling machine having a pair of metal rolls held at 170° C. to orient PTFE in the film and thereby form a non-porous, calendered PTFE film (thickness: 10 μm). This film was used as a sound-permeable membrane. The calendering direction corresponds to the MD direction of the sound-permeable membrane.

Besides the above film, another non-porous, calendered PTFE film (thickness: 10 μm) to be subjected to the measurement of the strength at break and water entry pressure and to the continuous water pressure loading test was obtained in the same manner as above, except for not performing the surface modification treatment.

Comparative Example 1

A cast PTFE film (thickness: 25 μm) as fabricated in Example 1 which had been subjected to neither the surface modification treatment nor calendering was used as a sound-permeable membrane of Comparative Example 1.

Comparative Example 2

A cast PTFE film (thickness: 10 μm) was obtained in the same manner as in Example 1, except that the total number of times of the dipping of the polyimide film in the PTFE dispersion and subsequent heating was reduced to two. The cast film thus obtained was used as a sound-permeable membrane of Comparative Example 2 without the surface modification treatment and calendering.

Example 2

A PTFE molding powder (TFEM-12 manufactured by DAIKIN INDUSTRIES, LTD.) in an amount of 100 parts by mass was charged into a mold having the shape of a cylinder having a height of 800 mm and an inner diameter of 200 mm (it should be noted that the bottom of the cylinder was closed) and was preformed under a pressure of 280 kg/cm² (27.5 MPa) for 1 hour. Next, the resulting preformed product of PTFE was removed from the mold, and then sintered at a temperature of 360° C. for 48 hours to give a PTFE block in the shape of a cylinder having a height of about 500 mm and an outer diameter of about 200 mm. This block was then placed in a stainless steel vessel having a height of 700 mm and an inner diameter of 200 mm, and the inside of the vessel was purged with nitrogen. After that, the block was further sintered at a temperature of 340° C. for 20 hours to obtain a cylindrical PTFE block to be cut.

Next, the obtained PTFE block was cut with a cutting lathe to obtain a 25-μm-thick PTFE film (skived film).

The skived film obtained was then subjected to a surface modification treatment and calendering in the same manner as in Example 1 to form a non-porous, calendered PTFE film (thickness: 10 μm), which was used as a sound-permeable membrane. The calendering direction corresponds to the MD direction of the sound-permeable membrane.

Besides the above film, another non-porous, calendered PTFE film (thickness: 10 μm) to be subjected to the measurement of the strength at break and water entry pressure and to the continuous water pressure loading test was obtained in the same manner as above except for not performing the surface modification treatment.

Comparative Example 3

A skived PTFE film (thickness: 25 μm) as fabricated in Example 2 which had been subjected to neither the surface modification treatment nor calendering was used as a sound-permeable membrane of Comparative Example 3.

Comparative Example 4

A skived PTFE film (thickness: 10 μm) was obtained in the same manner as in Example 2, except that the PTFE block was cut at a thickness of 10 μm. The skived film thus obtained was used as a sound-permeable membrane of Comparative Example 4 without the surface modification treatment and calendering.

Example 3

A cast PTFE film (thickness: 25 μm) was obtained in the same manner as in Example 1. Next, the cast film obtained was calendered by a rolling machine having a pair of metal rolls held at 170° C. to orient PTFE in the film and thereby form a non-porous, calendered PTFE film (thickness: 10 μm). The entireties of both principal surfaces of the calendered PTFE film thus formed were then subjected to a surface modification treatment using sputter etching at an energy of 15 J/cm² in an argon gas atmosphere. A sound-permeable membrane of Example 3 was thus obtained. The calendering direction corresponds to the MD direction of the sound-permeable membrane.

The air permeability of each of the sound-permeable membranes fabricated in Examples 1 to 3 was evaluated in terms of Frazier air permeability as specified in JIS L 1096. The value of the air permeability was zero, which confirmed that these sound-permeable membranes had no air permeability and hence that they were non-porous films.

Comparative Example 5

An amount of 100 parts by mass of a PTFE fine powder (650-J, manufactured by Du Pont-Mitsui Fluorochemicals Company, Ltd.) and 20 parts by mass of n-dodecane (manufactured by Japan Energy Corporation) as a forming aid were homogeneously mixed. The resulting mixture was compressed by a cylinder, and the compressed mixture was ram-extruded into a sheet. Next, the resulting sheet-shaped mixture was calendered to a thickness of 0.16 mm by passing it between a pair of metal rolls, and then dried by heating at 150° C. to remove the forming aid and thereby obtain a sheet-shaped PTFE product. Two pieces of the sheet-shaped PTFE product obtained as above were placed on top of each other and then stretched in their longitudinal direction (calendering direction) at a stretching temperature of 260° C. and a stretching ratio of 5, thus giving a porous PTFE membrane.

Next, the porous PTFE membrane fabricated as above was dipped in a liquid-repellent treatment solution for several seconds, after which the membrane was dried by heating at 100° C. to remove the solvent and thereby obtain a liquid-repellent porous PTFE membrane. The liquid-repellent treatment solution was prepared as follows. In a flask fitted with a nitrogen inlet tube, a thermometer, and a stirrer there were placed 100 g of a compound having a linear fluoroalkyl group and represented by the formula (2) below, 0.1 g of azobisisobutyronitrile as a polymerization initiator, and 300 g of a solvent (FS thinner manufactured by Shin-Etsu Chemical Co., Ltd.). Nitrogen gas was introduced into the flask, and addition polymerization was allowed to proceed under stirring at 70° C. for 16 hours, thus giving 80 g of a fluorine-containing polymer. This fluorine-containing polymer had a number average molecular weight of 100000. The fluorine-containing polymer obtained was then diluted with a diluent (FS thinner manufactured by Shin-Etsu Chemical Co., Ltd.) to a concentration of 3.0 mass %. In this manner, the liquid-repellent treatment solution was prepared.

$$CH_2=CHCOOCH_2CH_2C_6F_{13} \qquad \text{(Formula 2)}$$

Next, the liquid-repellent porous PTFE membrane was stretched in the width direction at a stretching temperature of 150° C. and a stretching ratio of 30, and the entire membrane was then sintered at a temperature of 360° C., which is higher than the melting point of PTFE (327° C.), to form a liquid-repellent porous PTFE membrane (thickness: 20 μm). This membrane was used as a sound-permeable membrane of Comparative Example 5.

The results of the evaluation of the sound-permeable membranes fabricated in Examples and Comparative Examples described above will now be discussed.

[Orientation of PTFE and Degree of Orientation]

Figure 14:
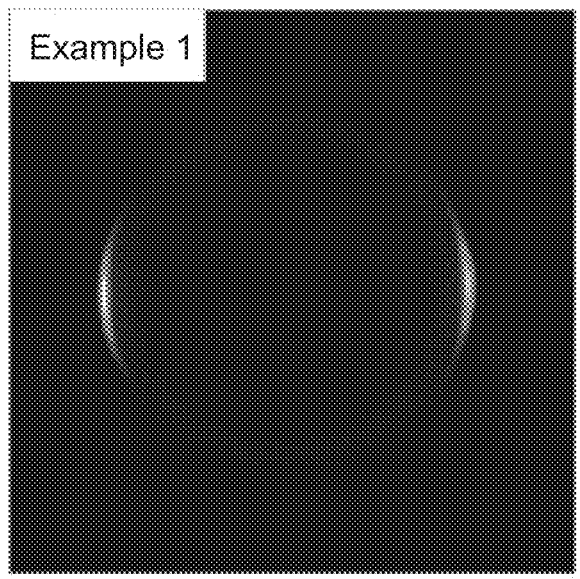
FIG. 14 shows a wide-angle X-ray diffraction (WAXD) pattern of a sound-permeable membrane fabricated in Example 1.
Figure 15:
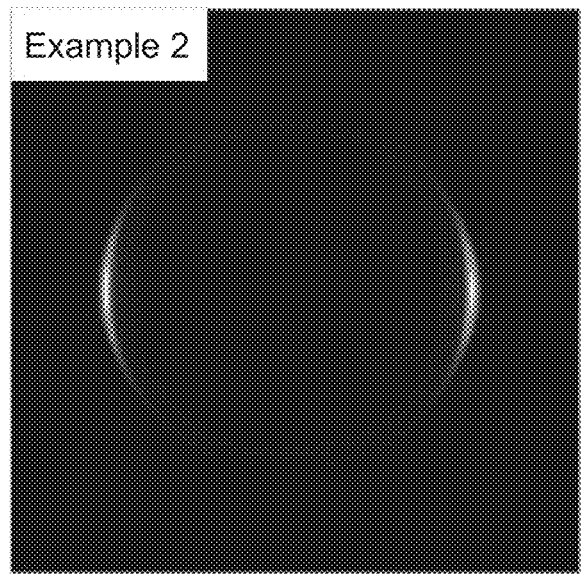
FIG. 15 shows a WAXD pattern of a sound-permeable membrane fabricated in Example 2.
Figure 16:
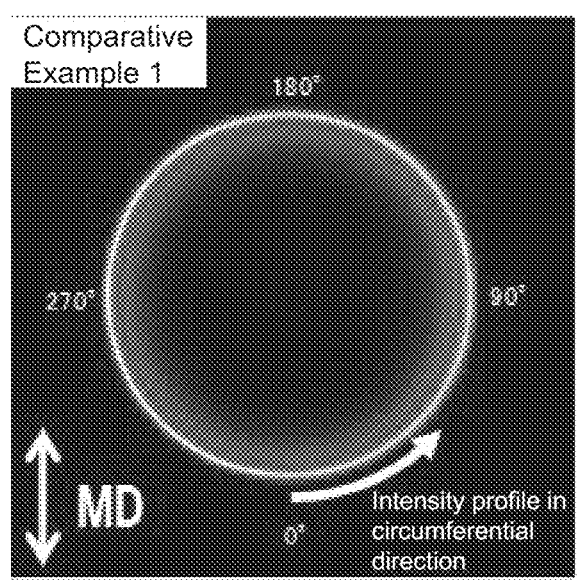
FIG. 16 shows a WAXD pattern of a sound-permeable membrane fabricated in Comparative Example 1.
Figure 17:
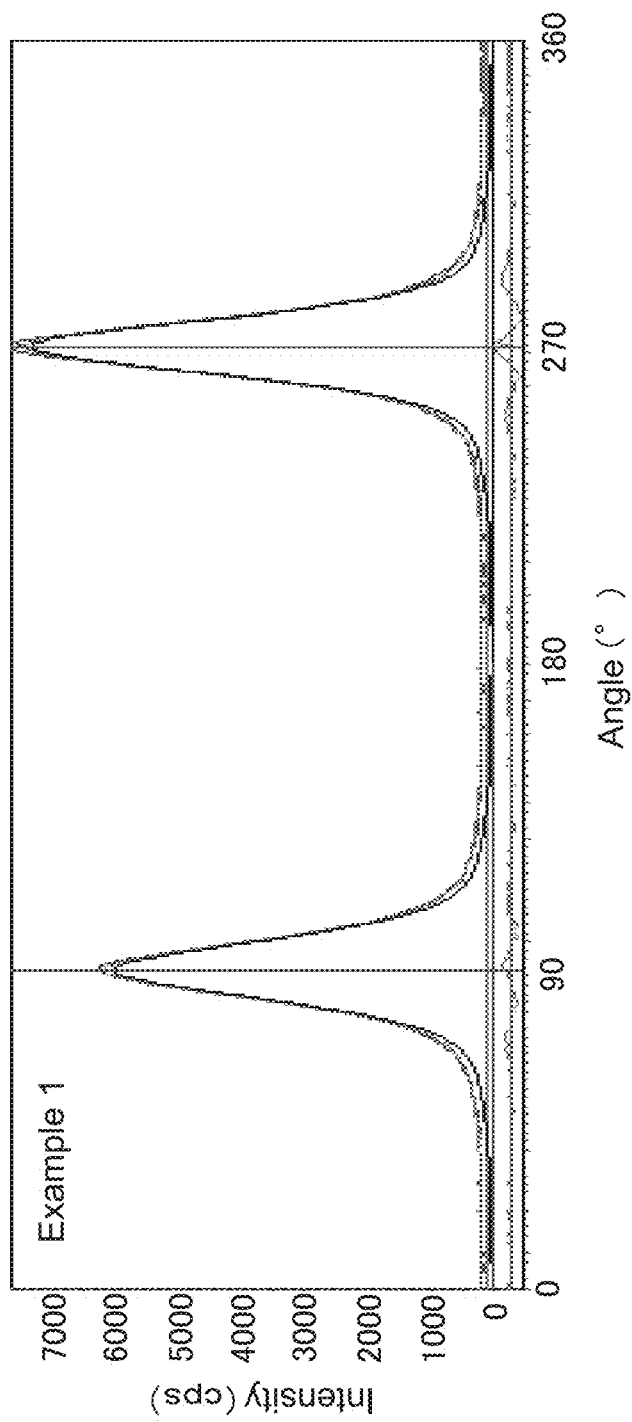
FIG. 17 shows the circumferential variation in intensity of a peak pattern observed at a diffraction angle 2θ of around 18° in the WAXD pattern of the sound-permeable membrane fabricated in Example 1.
Figure 18:
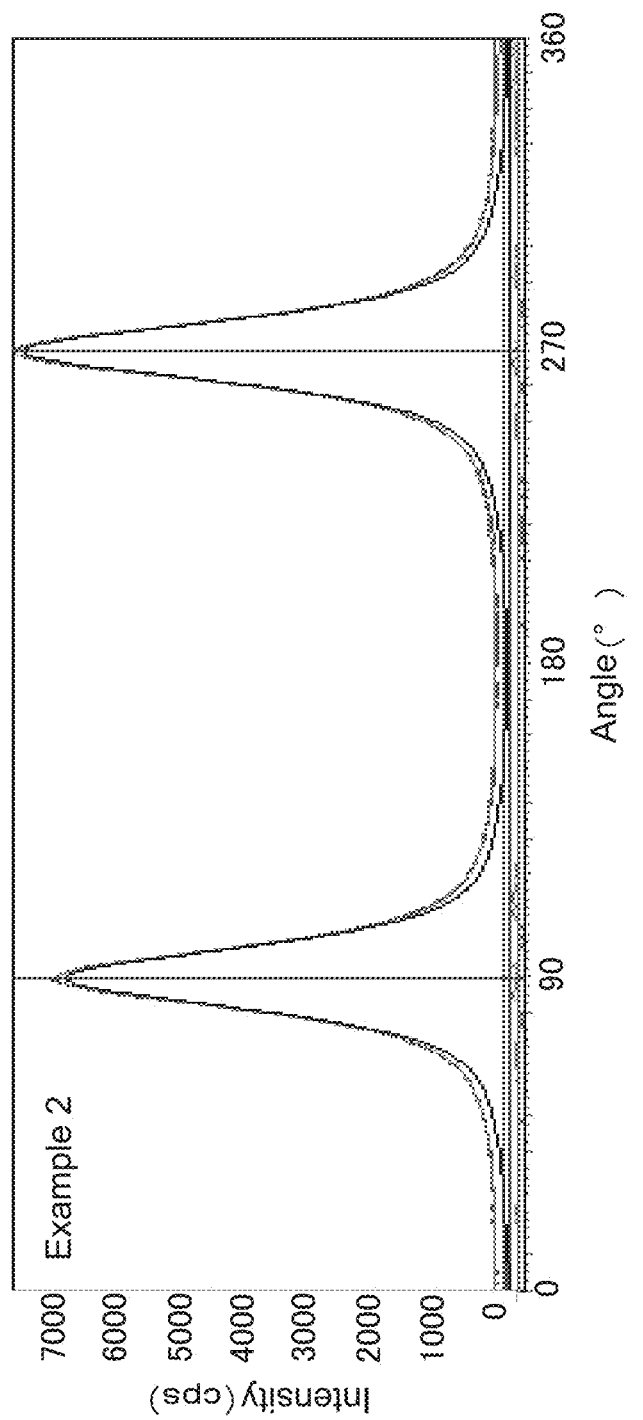
FIG. 18 shows the circumferential variation in intensity of a peak pattern observed at a diffraction angle 2θ of around 18° in the WAXD pattern of the sound-permeable membrane fabricated in Example 2.
Figure 19:
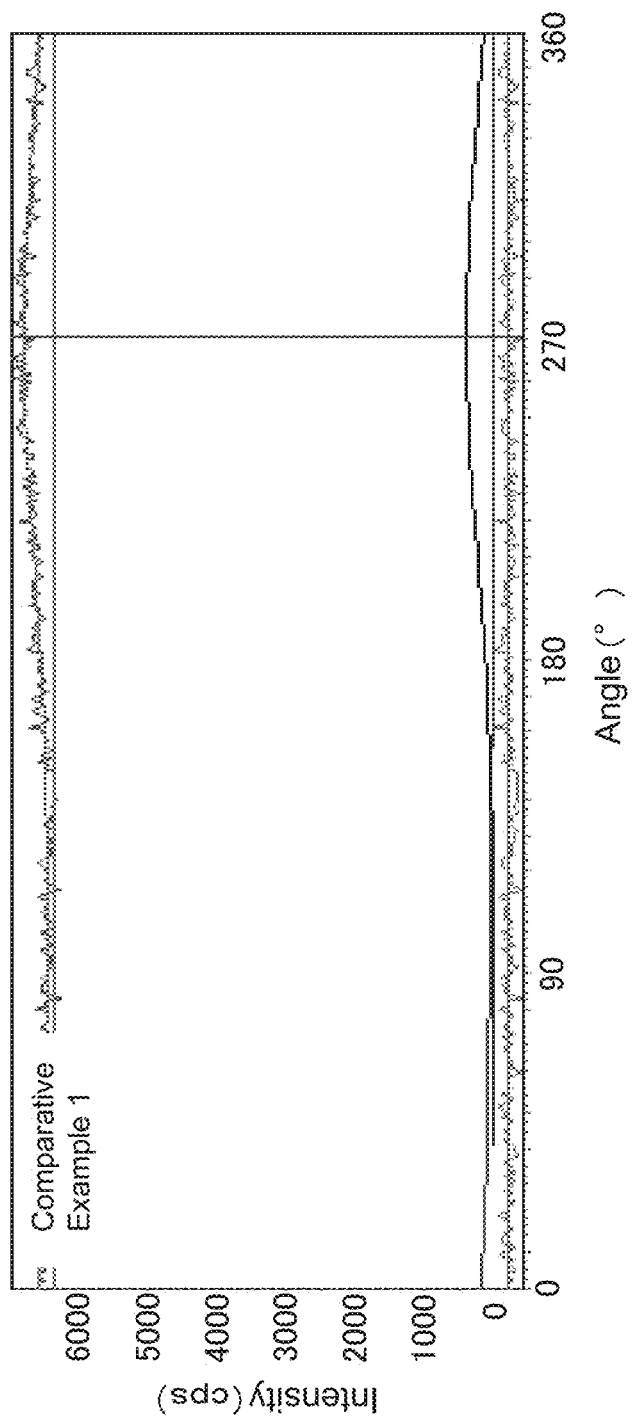
FIG. 19 shows the circumferential variation in intensity of a peak pattern observed at a diffraction angle 2θ of around 18° in the WAXD pattern of the sound-permeable membrane fabricated in Comparative Example 1.

WAXD patterns of the sound-permeable membranes fabricated in Example 1, Example 2, and Comparative Example 1 are shown in FIG. 14, FIG. 15, and FIG. 16, respectively. The vertical direction in the WAXD patterns shown in FIGS. 14 to 16 corresponds to the MD direction of the sound-permeable membranes. In the WAXD pattern of the sound-permeable membrane of Comparative Example 1, a ring-shaped peak over the entire circumference of which the peak intensity was substantially uniform was observed at a diffraction angle 2θ of around 18°, as shown in FIG. 16. The degree of orientation in the sound-permeable membrane of Comparative Example 1, as calculated by the above equation (1), was approximately zero. This confirmed that the sound-permeable membrane of Comparative Example 1 was formed of substantially non-oriented PTFE. In the WAXD patterns of the sound-permeable membranes of Examples 1 and 2, two concentrated peaks were observed at a diffraction angle 2θ of around 18°, the peaks being arranged on a line perpendicular to the MD direction as shown in FIGS. 14 and 15. The degree of orientation, as calculated by the above equation (1), was 89% for Example 1 and 88% for Example 2. This confirmed that the sound-permeable membranes of Examples 1 and 2 were formed of PTFE oriented in the MD direction. FIGS. 17 to 19 show the circumferential distribution of the peak intensity at a diffraction angle 2θ of 18° in the WAXD patterns of the sound-permeable membranes. The lowest point in each of the WAXD patterns shown in FIGS. 14 to 16 corresponds to an angle of 0°, from which the angle increases up to 360° in a counterclockwise direction. For the sound-permeable membrane of Comparative Example 1, the peak intensity was substantially uniform over the entire circumference of the circle at a diffraction angle 2θ of 18°, as seen from FIG. 19. By contrast, FIGS. 17 and 18 confirm that, for the sound-permeable membranes of Examples 1 and 2, peaks were concentrated at 90° and 270° (positions on a line perpendicular to the MD direction) on the circumference of the circle at a diffraction angle 2θ of 18°. It can be inferred that orientation identical to that in the sound-permeable membrane of Example 1 was achieved in the sound-permeable membrane of Example 3.

[Strength at Break]

TABLE 1

|  | Strength at break (MPa) |
| --- | --- |
| Example 1 | 94.5 |
| Example 2 | 99.6 |
| Comparative Example 1 | 41.5 |
| Comparative Example 3 | 59.8 |

As seen from Table 1, the sound-permeable membranes of Examples, despite being thin, showed a significantly improved strength at break, which was more than 90 MPa.

[Water Entry Pressure]

TABLE 2

|  | Water entry pressure (kPa) |
| --- | --- |
| Example 1 | 970 |
| Example 2 | 470 |
| Comparative Example 2 | 120 |
| Comparative Example 4 | 130 |
| Comparative Example 5 | 380 |

As seen from Table 2, the water entry pressure was significantly increased for the sound-permeable membranes of Examples. The water entry pressure measured for the membranes of Examples was higher than that measured for the sound-permeable membrane (Comparative Example 5) consisting of a liquid-repellent porous PTFE membrane having a thickness twice that of the membranes of Examples.

[Bond Strength]

TABLE 3

|  | Bond strength (N/19 mm) |
| --- | --- |
| Example 1 | 4.3 |
| Example 2 | 5.2 |
| Example 3 | 7.0 |
| Comparative Example 1 | 1.2 |
| Comparative Example 3 | 1.2 |

As seen from Table 3, the sound-permeable membranes of Examples showed a significantly improved bond strength.

[Bond Strength Expected to be Exhibited after Reflow Soldering]

TABLE 4

|  | Bond strength (N/19 mm) |
| --- | --- |
| Example 1 | 7.8 |
| Example 2 | 6.2 |
| Comparative Example 2 | Lifting occurred |
| Comparative Example 4 | Lifting occurred |
| Comparative Example 5 | 1.5 |

Table 4 confirms that the sound-permeable membranes of Examples will be well compatible with reflow soldering and maintain their bond strength after reflow soldering. In Comparative Examples 2 and 4, the measurement of the bond strength was impossible because the reflow test (heating test simulating reflow soldering) caused lifting due to separation between the sound-permeable membrane and the flexible printed board. The sound-permeable membrane (Comparative Example 5) consisting of a porous PTFE membrane showed a much lower bond strength than the membranes of Examples 1 and 2, although lifting was not caused by the reflow test.

[Surface Density and Insertion Loss (Insertion Loss Measured at a Sound Frequency of 1 kHz with the Effective Area Set to 4.9 mm$^2$)]

TABLE 5

|  | Surface density (g/m$^2$) | Insertion loss (dB) |
| --- | --- | --- |
| Example 1 | 24.7 | 2.1 |
| Example 2 | 25.0 | 2.7 |
| Comparative Example 1 | 53.5 | 14.3 |
| Comparative Example 3 | 56.0 | 12.6 |

As seen from Table 5, the sound-permeable membranes of Examples had a lower surface density and a smaller insertion loss than the sound-permeable membranes of Comparative Examples.

[Change in Insertion Loss with Change in Effective Area]

Figure 20:
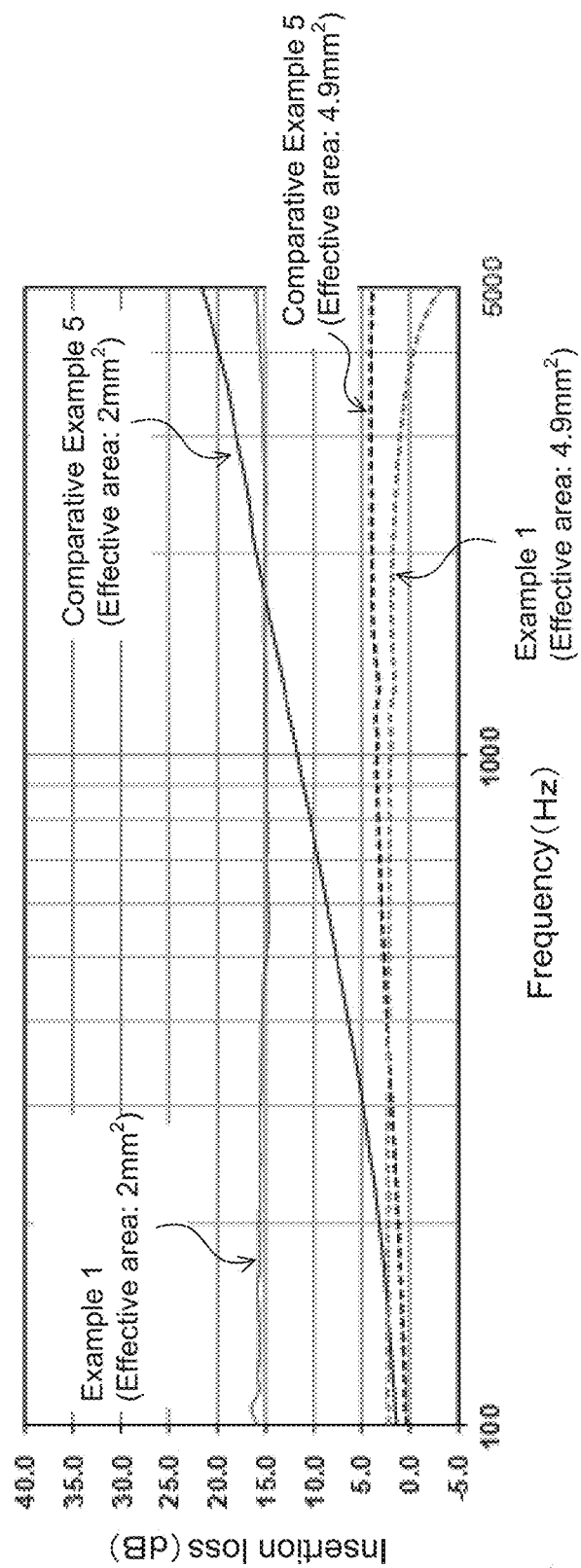
FIG. 20 shows the variation in insertion loss of the sound-permeable membranes fabricated in Example 1 and Comparative Example 5 in the frequency range of 100 Hz to 5 kHz (for the case where they had an effective area of 4.9 $mm^2$ and for the case where they had an effective area of 2 $mm^2$).

FIG. 20 shows the frequency dependence (100 Hz to 5 kHz) of the insertion loss of the sound-permeable membranes of Example 1 and Comparative Example 5 for the case where they had an effective area of 4.9 mm$^2$ and for the case where they had an effective area of 2 mm². The values of the insertion loss at sound frequencies of 100 Hz, 1 kHz, 3 kHz, and 5 kHz, together with the values of the difference between the maximum and minimum of the insertion loss in the frequency range of 100 Hz to 5 kHz, are shown in Table 6 below.

TABLE 6

| | Effective area (mm²) | Insertion loss (dB) | | | | Difference between maximum and minimum (dB) |
|---|---|---|---|---|---|---|
| | | 100 Hz | 1 kHz | 3 kHz | 5 kHz | |
| Example 1 | 4.9 | 2.2 | 2.0 | 1.0 | −3.0 | 3.0 |
| | 2.0 | 15.9 | 14.9 | 15.2 | 15.9 | 1.0 |
| Comparative Example 5 | 4.9 | 0.4 | 3.4 | 4.0 | 3.9 | 3.6 |
| | 2.0 | 1.4 | 11.7 | 18.0 | 21.6 | 20.2 |

As seen from FIG. 20 and Table 6, the insertion loss for sound transmitted through the sound-permeable membrane of Example was flat over a broad range of frequencies even when the membrane had a reduced effective area.

[Continuous Water Pressure Loading Test]

TABLE 7

| | Water pressure (kPa) | Rating |
|---|---|---|
| Example 1 | 200 | Good |
| | 300 | Good |
| Comparative Example 5 | 200 | Good |
| | 300 | Poor |

As seen from Table 7, the sound-permeable membrane of Example had an improved ability to maintain the water resistance.

[Change in Insertion Loss (Insertion Loss Measured at a Sound Frequency of 1 kHz with the Effective Area Set to 3.1 mm²) Before and after Continuous Water Pressure Loading Test]

TABLE 8

| | Insertion loss (dB) | |
|---|---|---|
| | Before test | After test |
| Example 1 | 3.5 | 3.8 |
| Comparative Example 5 | 4.0 | 7.7 |

As seen from Table 8, the increase in insertion loss after the continuous water pressure loading test was small for the sound-permeable membrane of Example.

The present invention may be embodied in other forms without departing from the spirit or essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

INDUSTRIAL APPLICABILITY

The sound-permeable membrane of the present invention can be used in any of various applications.

The invention claimed is:

1. A sound-permeable membrane adapted, when placed over an opening for directing sound to or from a sound transducer, to prevent entry of foreign matters into the sound transducer through the opening while permitting passage of sound,
    the sound-permeable membrane comprising a non-porous film or a multilayer membrane comprising the non-porous film,
    the non-porous film being formed of oriented polytetrafluoroethylene, wherein
    the sound-permeable membrane is configured so as not to break and/or leak water even when a water pressure of 300 kPa is continuously applied to the sound-permeable membrane for 10 minutes,
    the polytetrafluoroethylene in the non-porous film is oriented in one in-plane direction of the non-porous film, and
    the degree of orientation of the polytetrafluoroethylene in the non-porous film is 80% or more.

2. The sound-permeable membrane according to claim 1, having a surface density of 30 g/m² or less.

3. The sound-permeable membrane according to claim 1, wherein an average insertion loss in the frequency range of 100 to 5000 Hz is less than 5 dB.

4. The sound-permeable membrane according to claim 1, wherein the non-porous film is uncovered.

5. The sound-permeable membrane according to claim 1, wherein at least one principal surface of the non-porous film has a region subjected to a surface modification treatment.

6. The sound-permeable membrane according to claim 5, wherein the region is formed in a peripheral portion of the at least one principal surface.

7. The sound-permeable membrane according to claim 5, wherein the surface modification treatment is a chemical treatment or a sputter etching treatment.

8. The sound-permeable membrane according to claim 1, for use in a microphone.

9. A sound-permeable membrane member comprising:
    a sound-permeable membrane adapted, when placed over an opening for directing sound to or from a sound transducer, to prevent entry of foreign matters into the sound transducer through the opening while permitting passage of sound; and
    a bonding portion placed on a peripheral portion of at least one principal surface of the sound-permeable membrane to join the sound-permeable membrane to another member, wherein
    the sound-permeable membrane is the sound-permeable membrane according to claim 1.

10. The sound-permeable membrane member according to claim 9, wherein at least one principal surface of the non-porous film included in the sound-permeable membrane has a region subjected to a surface modification treatment.

11. The sound-permeable membrane member according to claim 10, wherein
    the non-porous film of the sound-permeable membrane is uncovered, and
    the bonding portion is placed on the region formed in an uncovered surface of the non-porous film.

12. The sound-permeable membrane member according to claim 9, wherein the bonding portion is formed of a double-coated adhesive tape or an adhesive.

13. The sound-permeable membrane member according to claim 12, wherein the double-coated adhesive tape is a thermosetting adhesive tape.

14. The sound-permeable membrane member according to claim 12, wherein the adhesive is an epoxy adhesive.

15. The sound-permeable membrane member according to claim 9, further comprising a printed board provided with a sound transmission hole, wherein
the sound-permeable membrane and the printed board are united together via the bonding portion in such a manner as to allow sound to pass through the sound transmission hole and the sound-permeable membrane.

16. The sound-permeable membrane member according to claim 9, for use in a microphone.

17. A microphone comprising:
a sound transducer;
a package enclosing the sound transducer and provided with a sound inlet port for directing sound to the sound transducer; and
a sound-permeable membrane joined to the package to cover the sound inlet port and adapted to prevent entry of foreign matters into the sound transducer through the sound inlet port while permitting passage of sound, wherein
the sound-permeable membrane is the sound-permeable membrane according to claim 1.

18. A microphone comprising:
a sound transducer;
a package enclosing the sound transducer and provided with a sound inlet port for directing sound to the sound transducer; and
a sound-permeable membrane member comprising a sound-permeable membrane joined to the package to cover the sound inlet port and adapted to prevent entry of foreign matters into the sound transducer through the sound inlet port while permitting passage of sound, wherein
the sound-permeable membrane member is the sound-permeable membrane member according to claim 9.

19. An electronic device comprising:
a housing; and
a microphone placed in the housing and comprising a sound transducer and a package enclosing the sound transducer, the package being provided with a sound inlet port for directing sound to the sound transducer, the housing being provided with a sound inlet port for directing sound to the microphone,
the electronic device further comprising a sound-permeable membrane joined to at least one member selected from the package and the housing so as to cover the sound inlet port of the at least one member, the sound-permeable membrane being adapted to prevent entry of foreign matters into the sound transducer through the sound inlet port while permitting passage of sound, wherein
the sound-permeable membrane is the sound-permeable membrane according to claim 1.

20. An electronic device comprising:
a housing; and
a microphone placed in the housing and comprising a sound transducer and a package enclosing the sound transducer, the package being provided with a sound inlet port for directing sound to the sound transducer,
the housing being provided with a sound inlet port for directing sound to the microphone,
the electronic device further comprising a sound-permeable membrane member comprising a sound-permeable membrane joined to at least one member selected from the package and the housing so as to cover the sound inlet port of the at least one member, the sound-permeable membrane being adapted to prevent entry of foreign matters into the sound transducer through the sound inlet port while permitting passage of sound, wherein
the sound-permeable membrane member is the sound-permeable membrane member according to claim 9.

21. The sound-permeable membrane according to claim 1, wherein a water entry pressure measured of the sound-permeable membrane according to a high hydraulic pressure method of a water penetration test specified in JIS L 1092 is 400 kPa or more.

22. The sound-permeable membrane according to claim 1, wherein a difference between the maximum and minimum of an insertion loss of the sound-permeable membrane in the frequency range of 100 to 5000 Hz is 15 dB or less when an effective area of the sound-permeable membrane is 4 mm$^2$ or less.

* * * * *